United States Patent
Fujii et al.

(10) Patent No.: US 10,504,508 B2
(45) Date of Patent: Dec. 10, 2019

(54) RESPONSE GENERATION DEVICE, DIALOG CONTROL SYSTEM, AND RESPONSE GENERATION METHOD

(71) Applicant: MITSUBISHI ELECTRIC CORPORATION, Tokyo (JP)

(72) Inventors: Yoichi Fujii, Tokyo (JP); Yusuke Koji, Tokyo (JP); Keisuke Watanabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/086,287

(22) PCT Filed: Apr. 11, 2016

(86) PCT No.: PCT/JP2016/061702
§ 371 (c)(1),
(2) Date: Sep. 18, 2018

(87) PCT Pub. No.: WO2017/179101
PCT Pub. Date: Oct. 19, 2017

(65) Prior Publication Data
US 2019/0096395 A1 Mar. 28, 2019

(51) Int. Cl.
*G10L 15/00* (2013.01)
*G10L 15/18* (2013.01)
*G10L 15/22* (2006.01)

(52) U.S. Cl.
CPC .......... *G10L 15/1815* (2013.01); *G10L 15/22* (2013.01)

(58) Field of Classification Search
CPC .......................... G10L 15/1815; G10L 15/22

USPC ........................................................ 704/257
See application file for complete search history.

(56) References Cited

U.S. PATENT DOCUMENTS

| 2006/0143681 A1 | 6/2006 | Lee et al. |
| 2010/0049515 A1 | 2/2010 | Sumiyoshi et al. |
| 2010/0235451 A1 | 9/2010 | Yu et al. |

(Continued)

FOREIGN PATENT DOCUMENTS

| JP | 2010-92286 A  | 4/2010 |
| TW | 200625157 A   | 7/2006 |
| TW | 201033819 A   | 9/2010 |

(Continued)

OTHER PUBLICATIONS

"Digital Voice Processing", Tokai University Press., Sep. 25, 1985, total of 40 pages.

(Continued)

*Primary Examiner* — Thierry L Pham
(74) *Attorney, Agent, or Firm* — Birch, Stewart, Kolasch & Birch, LLP

(57) ABSTRACT

A dialog management unit (31) selects a response template corresponding to a dialog state with a user and outputs a term symbol included in the response template to a comprehension level estimating unit (30). The comprehension level estimating unit (30) outputs the user's comprehension level of the input term symbol to the dialog management unit (31). A response generating unit (32) generates a response sentence on the basis of the response template selected by the dialog management unit (31), adds an explanatory sentence to the response sentence depending on the user's comprehension level of the term input from the dialog management unit (31), and outputs the response sentence.

13 Claims, 13 Drawing Sheets

(56) References Cited

U.S. PATENT DOCUMENTS

2015/0082189 A1   3/2015   Baer et al.

FOREIGN PATENT DOCUMENTS

TW   201519068 A   5/2015
WO   2008/084575 A1   7/2008

OTHER PUBLICATIONS

Taiwanese Office Action dated Sep. 13, 2017 of corresponding Taiwanese Application No. 105117002.

FIG. 2

| Condition Number | Estimation Condition | Weight ($w_i$) |
|---|---|---|
| 1 | (A) Before Outputting Speech Guidance Including Term or Explanatory Sentence of Term, (B) User Utters Term | 1.00 |
| 2 | (C) After Outputting Speech Guidance Including Term or Explanatory Sentence of Term, (B) User Utters Term | 0.30 |
| 3 | (C) After Outputting Speech Guidance Including Term or Explanatory Sentence of Term, (D) User Utters Word Other Than Term | 0.15 |
| 4 | (E) In State Where Selection Screen of Term Is Displayed, User Designates Function Corresponding to Term | 0.80 |
| 5 | (F) In State Where Selection Screen of Term Is Displayed, User Designates Function Other Than Function Corresponding to Term | 0.20 |
| 6 | (G) In State Where Selection Screen of Term Is Not Displayed, User Designates Function Corresponding to Term | 0.20 |

| Term Symbol | Condition Number | | | | | |
|---|---|---|---|---|---|---|
| | 1 | 2 | 3 | 4 | 5 | 6 |
| #North Up | 0 | 0 | 0 | 0 | 0 | 0 |
| #Heading Up | 0 | 0 | 0 | 0 | 0 | 0 |
| ⋮ | | | | | | |

FIG. 3B

| Term Symbol | Condition Number | | | | | |
|---|---|---|---|---|---|---|
| | 1 | 2 | 3 | 4 | 5 | 6 |
| #North Up | 3 | 3 | 2 | 1 | 3 | 1 |
| #Heading Up | 0 | 1 | 0 | 2 | 0 | 0 |
| ⋮ | | | | | | |

FIG. 4

| Term Symbol | Term | Explanatory Sentence |
|---|---|---|
| #North Up | North Up | Map Display With North Arranged Upward |
| #Heading Up | Heading Up | Map Display With Travelling Direction Arranged Upward |
| #VICS | VICS | Vehicle Information and Communication System |
| #Smart IC | Smart IC | Interchange That Can Pass by ETC Card |
| #2D Map | 2D Map | Two-Dimensional Map Display |
| #3D Map | 3D Map | Three-Dimensional Map Display |
| ⋮ | ⋮ | ⋮ |

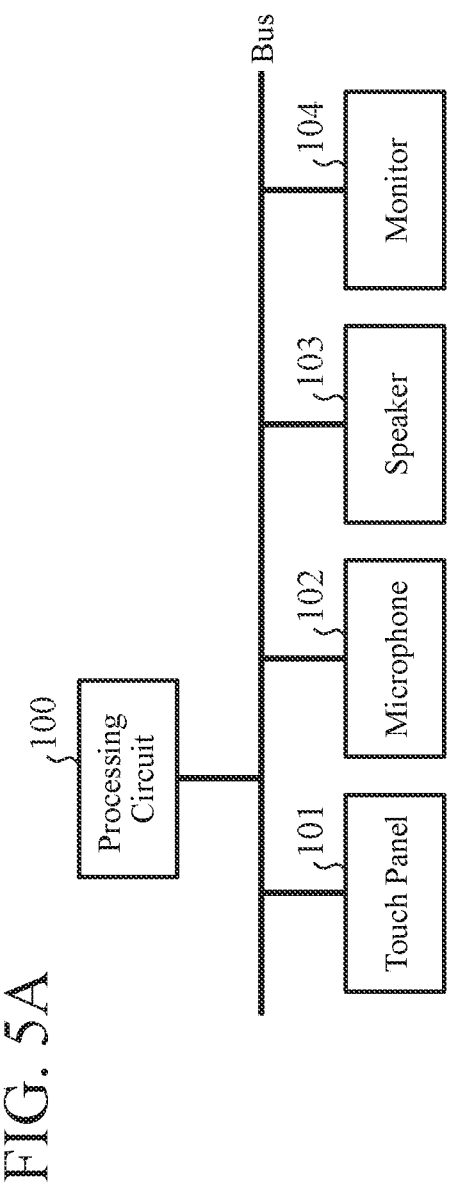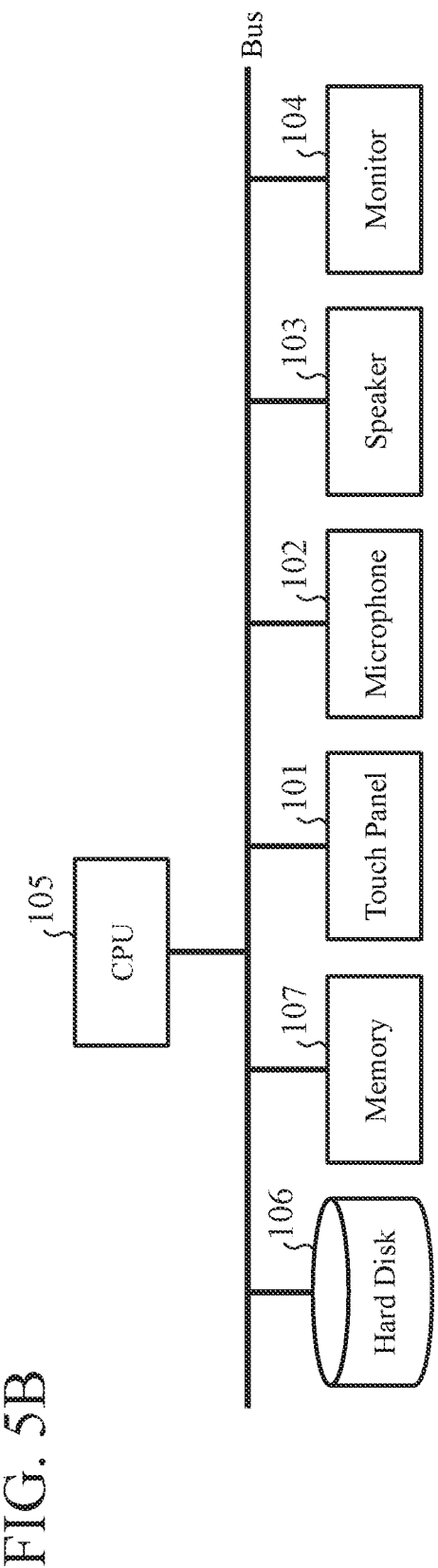
FIG. 5A
FIG. 5B

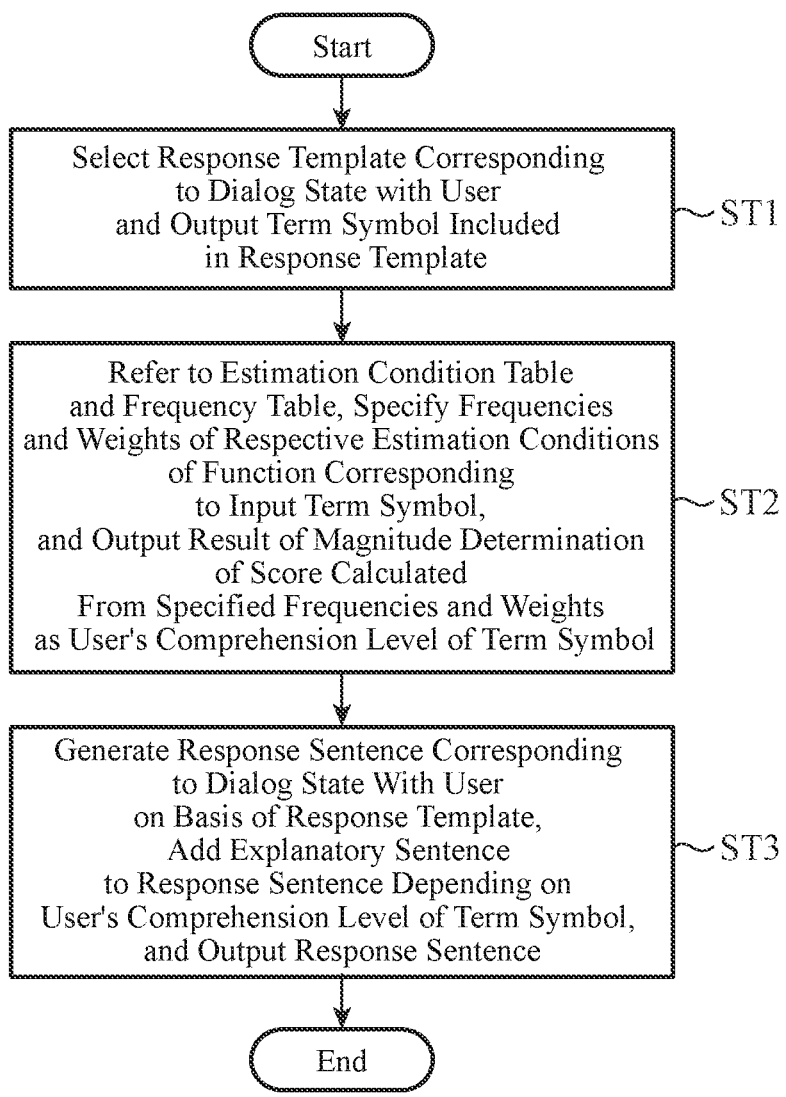

RESPONSE GENERATION DEVICE, DIALOG CONTROL SYSTEM, AND RESPONSE GENERATION METHOD

TECHNICAL FIELD

The present invention relates to a response generation device that estimates a user's comprehension level of terms used in a system in a dialog between the user and the system and generates a response sentence for facilitating comprehension of the user of the terms on the basis of the estimation result, a dialog control system including the response generation device, and a response generation method.

BACKGROUND ART

In recent years, attention has been focused on technologies of inputting speech of words uttered by humans and executing functions corresponding to recognition results of the input speech. These technologies are used as a speech interface of devices such as mobile phones and car navigations. As a basic algorithm, assumed speech recognition results and functions are associated in advance, and in a case where a recognition result of input speech has been assumed, a function corresponding to this recognition result is executed. Since a function is directly executed by utterance of a user in this manner, this is effective as a shortcut for designating a function to be executed.

Meanwhile, in order for a user to execute an intended function, it is necessary to utter a term corresponding to the function. Therefore, as the number of functions executable in a system increase, the number of terms the user has to memorize also increases. In this case, if the user does not sufficiently understand an operation manual of the system, there is a possibility that the user does not know which term should be uttered when executing the intended function.

As a conventional technique for solving such problems, there is a device described in Patent Literature 1, for example. In this device, the number of times of timeouts of speech input designating a function to be executed or the number of times of correction of this speech input is counted, and the comprehension level of a user with respect to the content of a guidance sentence encouraging designation of the function is estimated from the counting result. Then, from among guidance sentences having different degree of details of the content, a guidance sentence having a degree of details corresponding to the estimated comprehension level is presented to the user.

In addition, in a method described in Patent Literature 2, for example, feature words are extracted for each category from tag information of a user's social bookmark. Then, on the basis of history or other information of Web pages, the frequency at which a feature word is used in the Web pages accessed by the user is counted, and a category in which the usage frequency of the feature word is less than or equal to a threshold value is determined as a category unknown to the user. In the case where a feature word of a Web page browsed by the user belongs to the unknown category, it is determined that the feature word of this Web page is the user's unknown word, and an explanatory sentence of the unknown word is presented to the user.

CITATION LIST

Patent Literatures

Patent Literature 1: WO 2008/084575 A
Patent Literature 2: JP 2010-92286 A

SUMMARY OF INVENTION

Technical Problem

In the device described in Patent Literature 1, the comprehension level of a user with respect to a guidance sentence encouraging designation of a function to be executed is estimated, and the guidance sentence is changed to have a degree of details corresponding to this comprehension level and thereby presented to the user. However, this guidance sentence merely indicates the content to be uttered by the user for designating the function and does not explain terms themselves the content of which the user does not understand among terms designating functions. Therefore, no matter how much the content of the guidance sentence is changed, the user cannot understand the terms, and the state where the content of the terms is not understood continues even at the next speech input.

For example, in the case where the function of changing orientation of a map in a car navigation system is designated by speech input, in the device described in Patent Literature 1, even though it can be determined that the user does not know functions including a term "north up" or "heading up", it cannot be determined whether both or one of "north up" and "heading up" is not understood. Therefore, although it is possible to present response information with a higher degree of details to the user, it is not possible to present optimal response information to facilitate comprehension of the terms.

Also in a method described in Patent Literature 2, in the case where a feature word of a Web page browsed by the user belongs to the unknown category, it is determined that the feature word of this Web page is the user's unknown word, and an explanatory sentence of the unknown word is presented to the user.

However, the method described in Patent Literature 2 merely estimates the user's recognition level of the category and does not estimate the user's comprehension level of the term itself. Therefore, there is a problem in that response information that appropriately explains terms that the user does not understand cannot be presented.

For example in the case where north up is understood but heading up is not understood as functions relating to the orientation of a map, in the method described in Patent Literature 2, the comprehension level for "orientation of a map" which is a category to which these terms belong is estimated.

However, the user's comprehension level of terms themselves belonging to the category of "orientation of the map" is not estimated. For this reason, even in the case where the user's comprehension level of the term "north up" is high, there is a possibility that an explanatory sentence for this term is presented to the user, and even in the case where the user wants to know about the term "heading up", an explanatory sentence of this term may not be presented.

The present invention solves the above problems, and it is an object of the present invention to provide a response generation device, a dialog control system, and a response generation method capable of appropriately facilitating a user's comprehension of terms used in a dialog.

Solution to Problem

A response generation device according to the present invention includes a processor; and a memory storing instructions which, when executed by the processor, causes the processor to perform processes of: for selecting a response template corresponding to a dialog state with a user from among response templates corresponding to predetermined dialog states and outputting a term symbol included in the selected response template; for referring to an estimation condition table in which a plurality of estimation conditions defined by the predetermined dialog states and weights assigned to the respective estimation conditions corresponding to comprehension of term symbols are associated with each other and a frequency table in which frequencies at which a function is executed in the respective estimation conditions and a term symbol corresponding to the function are associated with each other, specifying the frequencies and the weights of the respective estimation conditions of the function corresponding to the input term symbol, and outputting a result of magnitude determination of a score calculated from the specified frequencies and the weights as a user's comprehension level of the term symbol: and for generating a response sentence in the dialog state with the user on a basis of the selected response template, adding an explanatory sentence to the response sentence depending on the user's comprehension level of the input term symbol, and outputting the response sentence.

Advantageous Effects of Invention

According to the present invention, the comprehension level of a user of a term symbol presented in a dialog with the user is estimated, and an explanatory sentence is added to a response sentence depending on the comprehension level, and thus it is possible to appropriately facilitate the user's comprehension of the term used in the dialog.

BRIEF DESCRIPTION OF DRAWINGS

FIG. 2 is a table illustrating an example of an estimation condition table.

FIG. 3A is a table illustrating an example of a frequency table in the case where a dialog is performed for the first time. FIG. 3B is a table illustrating an example of the frequency table in the case where dialog is performed multiple times.

FIG. 4 is a table illustrating an example of a term explanation table.

FIG. 5A is a diagram illustrating a hardware configuration for implementing the dialog control system. FIG. 5B is a diagram illustrating a hardware configuration for executing software for implementing the dialog control system.

FIG. 6 is a flowchart illustrating the operation of a response generation device according to the first embodiment.

DESCRIPTION OF EMBODIMENTS

To describe the invention further in detail, embodiments for carrying out the invention will be described below with reference to the accompanying drawings.

First Embodiment

Figure 1:
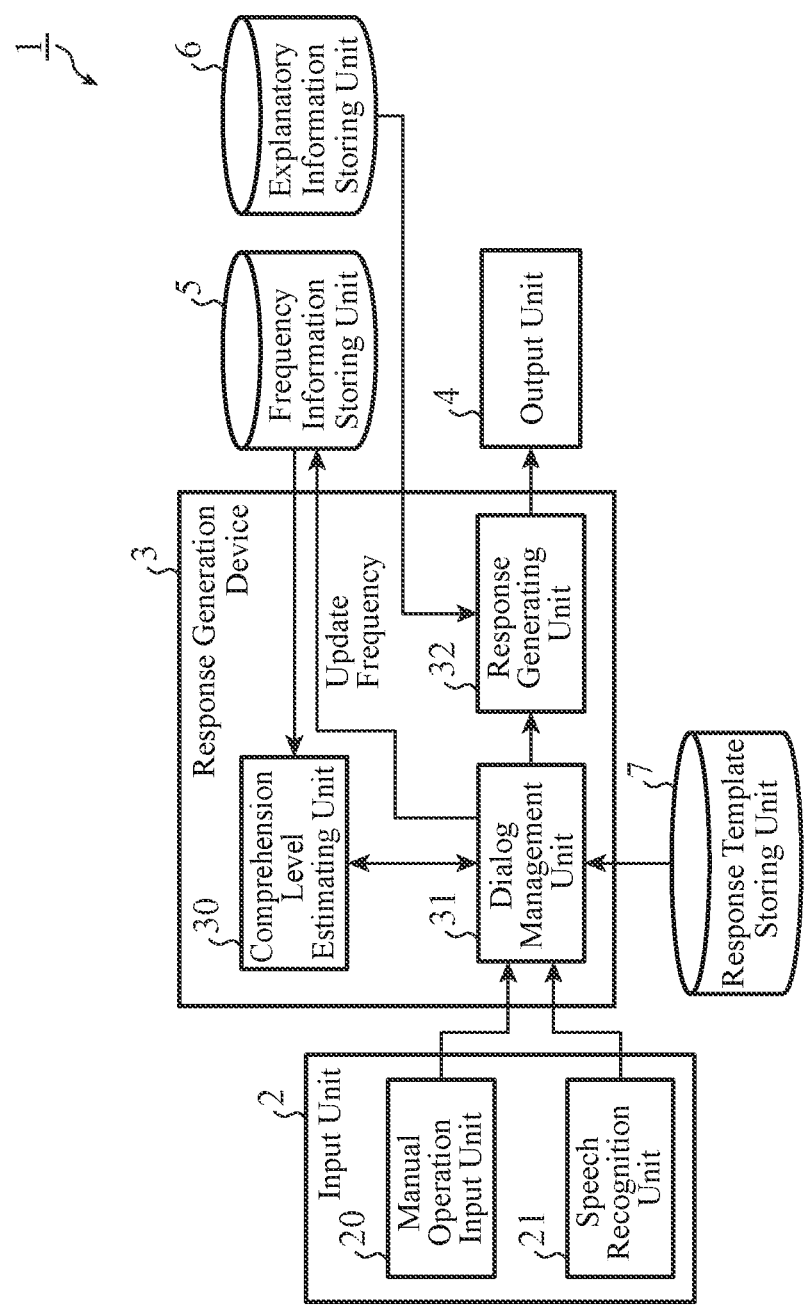
FIG. 1 is a block diagram illustrating a configuration of a dialog control system according to a first embodiment of the invention.

FIG. 1 is a block diagram illustrating a configuration of a dialog control system 1 according to a first embodiment of the invention. As illustrated in FIG. 1, the dialog control system 1 controls input and output of information in dialog with a user, and includes an input unit 2, a response generation device 3, an output unit 4, a frequency information storing unit 5, an explanatory information storing unit 6, and a response template storing unit 7.

The input unit 2 is a component that accepts information input from a user, and includes a manual operation input unit 20 and a speech recognition unit 21. The response generation device 3 generates a response sentence presented in a dialog with a user, and includes a comprehension level estimating unit 30, a dialog management unit 31, and a response generating unit 32.

The output unit 4 audibly or visually presents the response sentence output from the response generation device 3 to the user. For example, the response sentence is synthesized into a speech and thereby output. Alternatively, the response sentence is displayed on a monitor screen as text information.

The frequency information storing unit 5 stores frequency information obtained for each user engaged in a dialog. The frequency information includes an estimation condition table and a frequency table.

FIG. 2 is a table illustrating an example of an estimation condition table 5A. The estimation condition table 5A is table information in which a plurality of estimation conditions and weights $w_i$ assigned to the respective estimation conditions corresponding to the comprehension of term symbols are associated with each other. In the case of FIG. 2, estimation conditions to which condition numbers 1 to 6 are allocated and weights $w_i$ assigned to the respective estimation conditions are associated with each other in the estimation condition table 5A.

Note that i is a suffix indicating a condition number, and in the case of FIG. 2, i=1 to 6.

The estimation condition is defined by a dialog state assumed in a dialog with a user. For example, the estimation condition of condition number 1 is defined by a dialog state that "the user uttered a term before speech guidance including the term or an explanatory sentence of the term is output".

In this case, since the user has suddenly uttered the term without output of the speech guidance, there is a high possibility that the user has uttered the term with comprehension of the content of the term.

Therefore, the estimation condition of condition number 1 is assigned with 1.00, which is the largest for the weight $w_1$ relating to the user's comprehension of the term symbol.

Meanwhile, the estimation condition of condition number 5 is defined by a dialog state that "while a selection screen of a term is displayed, the user has designated a function other than a function corresponding to the term".

In this case, even though the selection screen of the term is displayed, the user has designated a function other than the function corresponding to the term symbol using the input unit 2. It is conceivable from this that it is highly likely that the user does not understand the term of the selection screen well and thus has designated a function different from the function corresponding to the term symbol.

Therefore, the estimation condition of condition number 5 is assigned with 0.20, which is relatively small as the weight $w_5$ relating to the user's comprehension of the term symbol.

FIG. 3A is a table illustrating an example of a frequency table 5B in the case where a dialog is performed for the first time. FIG. 3B is a table illustrating an example of the frequency table 5B in the case where dialog is performed multiple times.

The frequency table 5B is table information, in which a frequency $f_i$ at which a function is designated and executed in a dialog state of each of estimation conditions is associated with a term symbol corresponding to the function, and includes frequency data for each term symbol. Frequency data indicates frequencies $f_i$ at which a function corresponding to a term symbol is designated and executed by a user under estimation conditions of condition numbers 1 to 6.

A term symbol corresponds to a function that a user can designate through a dialog, and a term or an explanatory sentence of a term is set. Note that in the following description, setting of a term or an explanatory sentence to a term symbol is described as "inserting a term or an explanatory sentence to a term insertion position" as appropriate, both of which mean the same.

Frequency data 5B-1 of the term symbol "#north up" indicates frequencies $f_1$ to $f_6$ at which a function corresponding to the term symbol "#north up" is designated and executed by the user under estimation conditions of condition numbers 1 to 6, respectively. Incidentally, the function corresponding to the term symbol "#north up" is a function of displaying a map such that the north is oriented upward.

Frequency data 5B-2 of the term symbol "#heading up" indicates frequencies $f_1$ to $f_6$ at which a function corresponding to the term symbol "#heading up" is designated and executed by the user under estimation conditions of condition numbers 1 to 6, respectively. Incidentally, the function corresponding to the term symbol "#heading up" is a function of displaying a map such that traveling direction of the vehicle is oriented upward.

Note that, since the frequency table 5B illustrated in FIG. 3A corresponds to information when a dialog is performed for the first time, the frequency $f_i$ is not counted. Therefore, the frequencies $f_i$ of both the frequency data 5B-1 and the frequency data 5B-2 are 0.

On the other hand, since the frequency table 5B illustrated in FIG. 3B is information obtained when a dialog is performed multiple times, the frequencies $f_i$ are counted in both the frequency data 5B-1 and the frequency data 5B-2. For example, the frequency $f_2$ is 3 under an estimation condition of condition number 2 in the frequency data 5B-1.

This indicates that the frequency $f_2$ at which the function corresponding to the term symbol "#north up" is designated and executed by the user is three times under the estimation condition of condition number 2.

The explanatory information storing unit 6 stores a term explanation table.

FIG. 4 is a table illustrating an example of a term explanation table 5C. The term explanation table 5C is table information in which term symbols used in a dialog with a user are associated with terms and explanatory sentences set to the term symbols. Note that an explanatory sentence is defined in a form that ends with a noun so that a correct sentence is generated when set to a term symbol.

For example, an explanatory sentence of the term "north up" is defined as "map display with the north arranged upward".

In the case of a response template of "Would you like {#north up}?", setting the explanatory sentence to the term symbol #north up results in a response sentence of "Would you like map display with the north arranged upward?", which is a sentence that makes sense.

Note that setting the term "north up" to the term symbol #north up results in a response sentence of "Would you like north up?".

Also in the term explanation table 5C, an explanatory sentence of a term "VICS" is defined as "vehicle information and communication system", and an explanatory sentence of a term "smart IC" is defined as "interchange that can pass by an ETC card". These terms are also defined in such a manner as to end with a noun such that a sentence makes sense when an explanatory sentence is set to a term symbol.

Note that the VICS and the ETC are registered trademarks.

The response template storing unit 7 is a storage that stores predetermined dialog states and response templates corresponding to these dialog states.

A response template is a template of a sentence presented to a user from the system side in each dialog state, and a term symbol described above may be arranged therein in some cases. Hereinafter, a sentence generated on the basis of a response template will be referred to as a response sentence.

The manual operation input unit 20 of the input unit 2 is a component that accepts information input by manual operation of a user and includes hardware such as a hardware button and a touch panel and software for accepting information input using these. The speech recognition unit 21 recognizes the speech uttered by the user and acquires a text of the recognition result.

As described above, since frequency information for each user is stored in the frequency information storing unit 5, it is necessary to allow the system side to identify a user. Therefore, when interacting with the system, the user inputs identification information for identifying the user using the input unit 2. On the system side, frequency information corresponding to the user is used by specifying the user using this identification information.

Note that a known technique may be used for speech recognition of the speech recognition unit 21 and speech synthesis of the output unit 4. For example, a technique described in chapter 7 (pages 134 to 148) and chapter 8 (pages 149 to 192) of the following reference literature is used.

(Reference literature) "Digital Voice Processing", Tokai University Press., 25 Sep. 1985

The comprehension level estimating unit 30 specifies frequencies and the weights of the respective estimation conditions of a function corresponding to a term symbol input from the dialog management unit 31 by referring to the estimation condition table 5A and the frequency table 5B and outputs a result of magnitude determination of a score calculated from the specified frequencies and the weights to the dialog management unit 31 as the user's comprehension level of the term symbol.

For example, the comprehension level estimating unit 30 refers to the estimation condition table 5A and specifies an estimation condition (condition number i) indicating a dialog state in which the function has been executed and a weight $w_{ij}$ assigned to the estimation condition depending on the comprehension of a term symbol j corresponding to this function. Note that j is a suffix indicating the term symbol. Next, the comprehension level estimating unit 30 refers to the frequency table 5B and specifies a frequency $f_{ij}$ at which the function corresponding to the term symbol j is executed for each of the estimation conditions. Then, the comprehension level estimating unit 30 calculates a score $\Sigma f_{ij} \cdot w_{ij}$ which is the sum of values $f_{ij} \cdot w_{ij}$ obtained by multiplying each of the frequencies $f_{ij}$ and the weights $w_{ij}$ that are specified for the respective estimation conditions in this manner and uses a result of magnitude determination of this score as the user's comprehension level of the term symbol j.

The dialog management unit 31 selects a response template corresponding to a dialog state with the user from among response templates corresponding to predetermined dialog states, outputs a term symbol included in the selected response template to the comprehension level estimating unit 30, and acquires the user's comprehension level of the term symbol.

For example, on the basis of the input information accepted from the user by the input unit 2, the dialog management unit 31 specifies the dialog state with the user and a function that the user intends to execute. Then, the dialog management unit 31 selects a response template corresponding to a dialog state assumed to follow the specified dialog state from the response template storing unit 7. The dialog management unit 31 outputs a term symbol included in the response template selected in this manner to the comprehension level estimating unit 30 and acquires the user's comprehension level of the term symbol from the comprehension level estimating unit 30.

Also, each time the function corresponding to the term symbol designated by the user is executed, the dialog management unit 31 updates the content of the frequency table 5B for this term symbol stored in the frequency information storing unit 5. For example, in the case where a function corresponding to the term symbol "#north up" is executed under the estimation condition of condition number 2, the dialog management unit 31 increments the frequency $f_2$ corresponding to condition number 2 of the frequency data 5B-1 by +1.

The response generating unit 32 generates a response sentence corresponding to the dialog state with the user on the basis of the response template selected by the dialog management unit 31, adds an explanatory sentence to the response sentence depending on the user's comprehension level of the term symbol input from the dialog management unit 31, and outputs the response sentence.

For example, in a case where the user's comprehension level of the term symbol acquired by the dialog management unit 31 is greater than or equal to a threshold value X, the response generating unit 32 determines that the user's comprehension level of the term symbol is high and outputs without adding the explanatory sentence to the response sentence.

On the other hand, in the case where the user's comprehension level of the term symbol is less than the threshold value X, the response generating unit 32 determines that the user's comprehension level of the term symbol is low, generates and outputs a sentence in which an explanatory sentence is followed by the response sentence or a sentence in which the response sentence is followed by an explanatory sentence of the term.

In particular, by presenting to the user the sentence in which the explanatory sentence is followed by the response sentence as response information, the user can know in advance the content of the term included in the response sentence from this explanatory sentence.

FIG. 5A is a diagram illustrating a hardware configuration for implementing the dialog control system 1. Meanwhile, FIG. 5B is a diagram illustrating a hardware configuration for executing software for implementing the dialog control system 1. In the dialog control system 1, the manual operation input unit 20 of the input unit 2 is implemented by using, for example, a touch panel 101 illustrated in FIGS. 5A and 5B. In addition, the speech recognition unit 21 performs speech recognition on the user's uttered speech input from a microphone 102. The output unit 4 performs speech synthesis on the response sentence output from the response generation device 3 and outputs the speech from a speaker 103 or displays text information of the response sentence on a monitor 104.

The functions of the comprehension level estimating unit 30, the dialog management unit 31, and the response generating unit 32 in the response generation device 3 are implemented by a processing circuit. That is, the response generation device 3 includes a processing circuit for successively performing the processing from step ST1 to step ST3 illustrated in FIG. 6.

The processing circuit may be dedicated hardware or a central processing unit (CPU) 105 that reads and executes a program stored in a memory 107.

Moreover, the frequency information storing unit 5, the explanatory information storing unit 6, and the response template storing unit 7 may be configured in a storage area of a hard disk drive 106 illustrated in FIG. 5B, or may be configured in an external storage device that can read and write information to and from the response generation device 3.

In the case where the processing circuit is a processing circuit 100 of dedicated hardware as illustrated in FIG. 5A, the processing circuit 100 may include a single circuit, a composite circuit, a programmed processor, a parallel programmed processor, an application specific integrated circuit (ASIC), a field-programmable gate array (FPGA), or a combination thereof.

In addition, the functions of the respective units of the comprehension level estimating unit 30, the dialog management unit 31, and the response generating unit 32 may be separately implemented by processing circuits, or the functions of the respective units may be collectively implemented by one processing circuit.

When the processing circuit is a CPU 105 as illustrated in FIG. 5B, the functions of the comprehension level estimating unit 30, the dialog management unit 31, and the response generating unit 32 are implemented by software, firmware, or a combination of software and firmware.

Software and firmware are described as a program and stored in a memory 107. The CPU 105 reads and executes the program stored in the memory 107 and thereby implements functions of the units. That is, the response generation device 3 includes the memory 107 for storing a program executing the processing from the respective steps in FIG. 6 described above as a result when the program is executed by the CPU 105.

Moreover, these programs cause a computer to execute the procedures or methods of the comprehension level estimating unit 30, the dialog management unit 31, and the response generating unit 32.

Note that some of the functions of the comprehension level estimating unit 30, the dialog management unit 31, and the response generating unit 32 may be implemented by dedicated hardware, and others thereof may be implemented by software or firmware. For example, the comprehension level estimating unit 30 implements the function thereof by using the processing circuit 100 of dedicated hardware while the dialog management unit 31 and the response generating unit 32 implement the functions thereof by the CPU 105 executing programs stored in the memory 107.

In this manner, the processing circuit can implement the functions described above by hardware, software, firmware, or a combination thereof.

Each of the components included in the dialog control system 1 may be at least one of an information processing device mounted on a vehicle or the like used by a user, a mobile terminal device, and a server device capable of exchanging information with these devices.

For example, an information processing device includes the input unit 2 and the output unit 4 while the response generation device 3 is configured in a server device capable of communicating with the information processing device. With this configuration, it is possible to implement the dialog control system 1 from the information processing device and the server device.

Note that the dialog control system 1 may be implemented by replacing the information processing device with a mobile terminal device in this configuration.

Next, the operation will be described.

Figure 7:
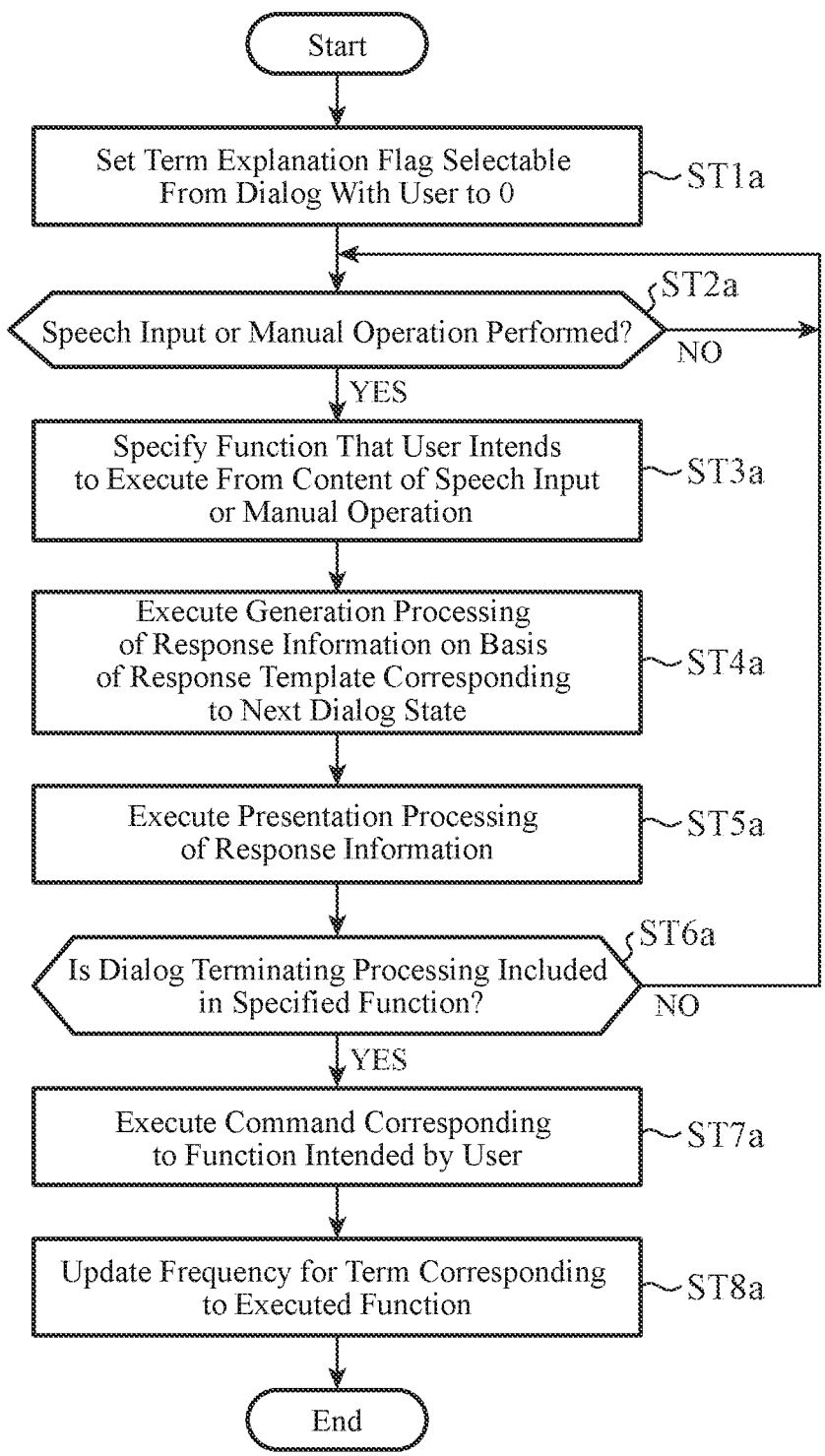
FIG. 7 is a flowchart illustrating the operation of the dialog control system according to the first embodiment.
Figure 8:
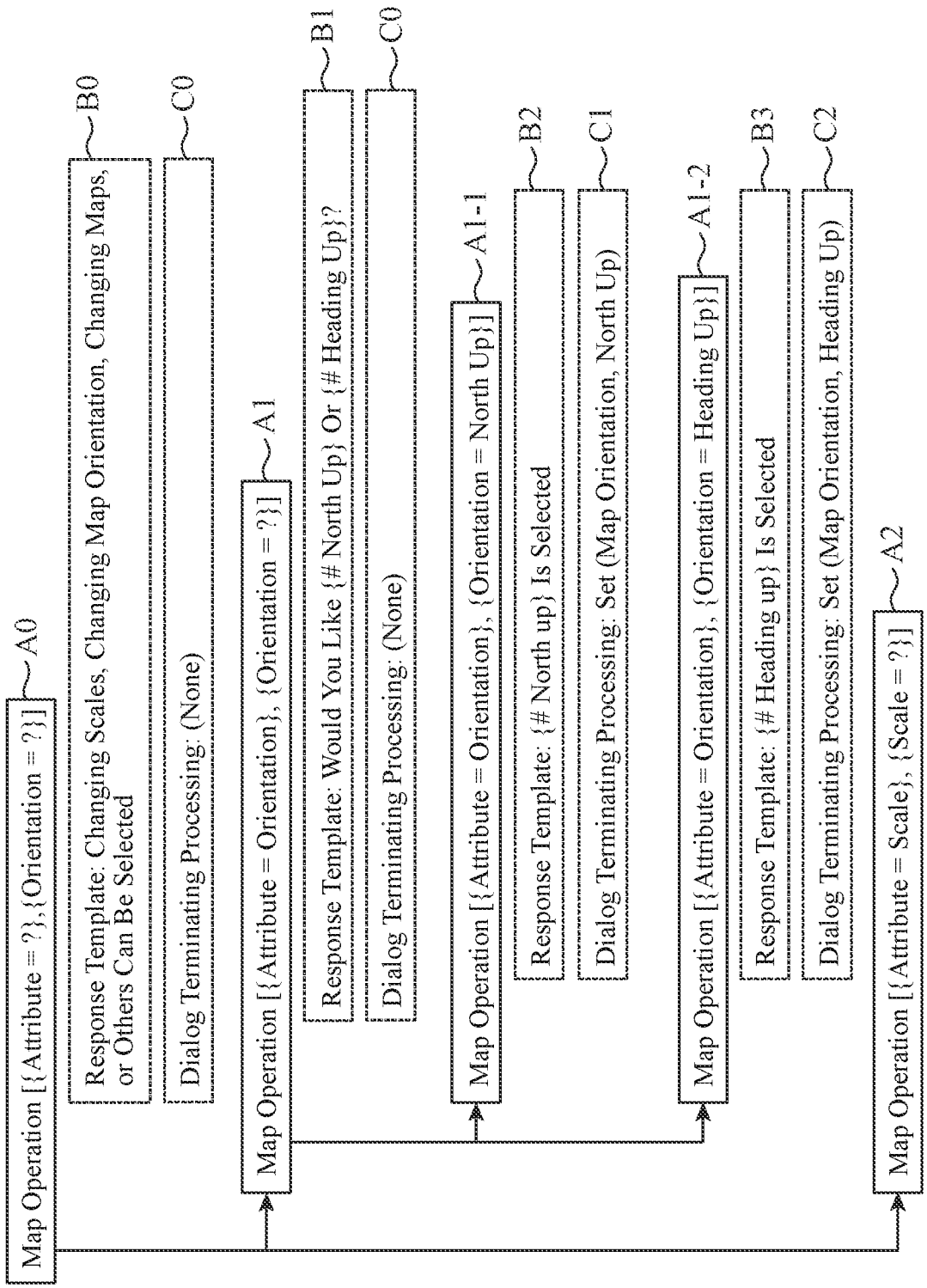
FIG. 8 is a diagram illustrating specific examples of control information defining functions executable through dialog with a user and response templates corresponding to the respective functions.

FIG. 7 is a flowchart illustrating the operation of the dialog control system 1 according to the first embodiment and illustrates a series of processing executed through a dialog with a user. In addition, FIG. 8 is a diagram illustrating specific examples of control information defining functions executable through a dialog with a user and response templates corresponding to the respective functions. Hereinafter, it is assumed that a user engaged in a dialog inputs the user's own identification information using the input unit 2 and that the user is thereby identified on the dialog control system 1 side.

It is further assumed that, in a dialog with the user, a response template is selected in accordance with the function illustrated in FIG. 8 and that a response sentence based on this is presented.

Hereinafter, the case where the user uses the dialog control system 1 for the first time and the case where the user has used the dialog control system 1 multiple times and frequency data is accumulated will be described.

When the dialog control system 1 is used by the user for the first time, the dialog management unit 31 sets 0 to the term explanation flag of each term symbol used in the dialog with the user (step ST1*a*). The term explanation flag is a flag for explaining a term symbol only once in the series of dialog processing in FIG. 7, and a response sentence to which an explanatory sentence is added is presented to the user by setting 0 to the term explanation flag. When the response sentence to which an explanatory sentence is added is presented to the user in a series of dialog processing, 1 is set to the term explanation flag for this term symbol.

Next, the dialog management unit 31 enters a stand-by state for the user's speech input or input by manual operation using the input unit 2 (step ST2*a*). If there is no speech input nor manual input (step ST2*a*: NO), the processing of step ST2*a* is repeated.

In the case of inputting, by speech, a function that the user wants to execute, that is, a term corresponding to the function intended by the user, the user utters the term after pressing an utterance start button.

The utterance start button serves as a trigger for the speech recognition unit 21 to recognize the speech input from the microphone 102. As a result, the speech recognition unit 21 recognizes the speech uttered by the user and outputs the recognition result to the dialog management unit 31. Note that it is assumed here that there is no erroneous recognition of speech by the speech recognition unit 21 and that the input speech is always correctly recognized.

Subsequently, if there is a speech input or input by manual operation by the user (step ST2*a*: YES), the dialog management unit 31 specifies the function intended by the user on the basis of the content of the input information by the speech input or the manual operation (step ST3*a*).

For example, when "map operation" is uttered or "map operation" is pressed by a software button, the dialog management unit 31 specifies a function A0 intended by the user.

In step ST4*a*, the dialog management unit 31 selects a response template B0 corresponding to a next dialog state for the function A0 from among the response templates stored in the response template storing unit 7 and outputs the response template B0 to the response generating unit 32. As illustrated in FIG. 8, the response template B0 does not include term symbols, and thus the response generating unit 32 generates a response sentence on the basis of the response template B0. As a result, for example, a response sentence of "Changing scales, changing the map orientation, changing maps, or others can be selected" is generated and output to the output unit 4.

The output unit 4 presents the response sentence to the user (step ST5*a*).

For example, the output unit 4 displays options such as "changing scales", "changing the map orientation", "changing maps" on the monitor 104 and synthesizes a speech of the response sentence of "Changing scales, changing the map orientation, changing maps, or others can be selected" and outputs the speech from the speaker 103.

The dialog management unit 31 verifies whether the function specified in step ST4*a* includes processing of terminating a dialog (step ST6*a*).

In the function A0 designated by the user, dialog terminating processing C0 is set as illustrated in FIG. 8. As illustrated by "(none)" in the dialog terminating processing C0, no processing for terminating the dialog is set. Therefore, the flow returns to the processing of step ST2*a*.

It is assumed that "changing the map orientation" is designated by the user's operation input. In this case, the processing from step ST2*a* to step ST3*a* described above is executed, and two keywords of "north up" and "heading up" representing functions A1-1 and A1-2 that can make a transition from the function A1 intended by the user are displayed on the screen of the monitor 104. Subsequently, generation processing of response information is executed in step ST4*a*, details of which will be described with reference to FIG. 9.

Figure 9:
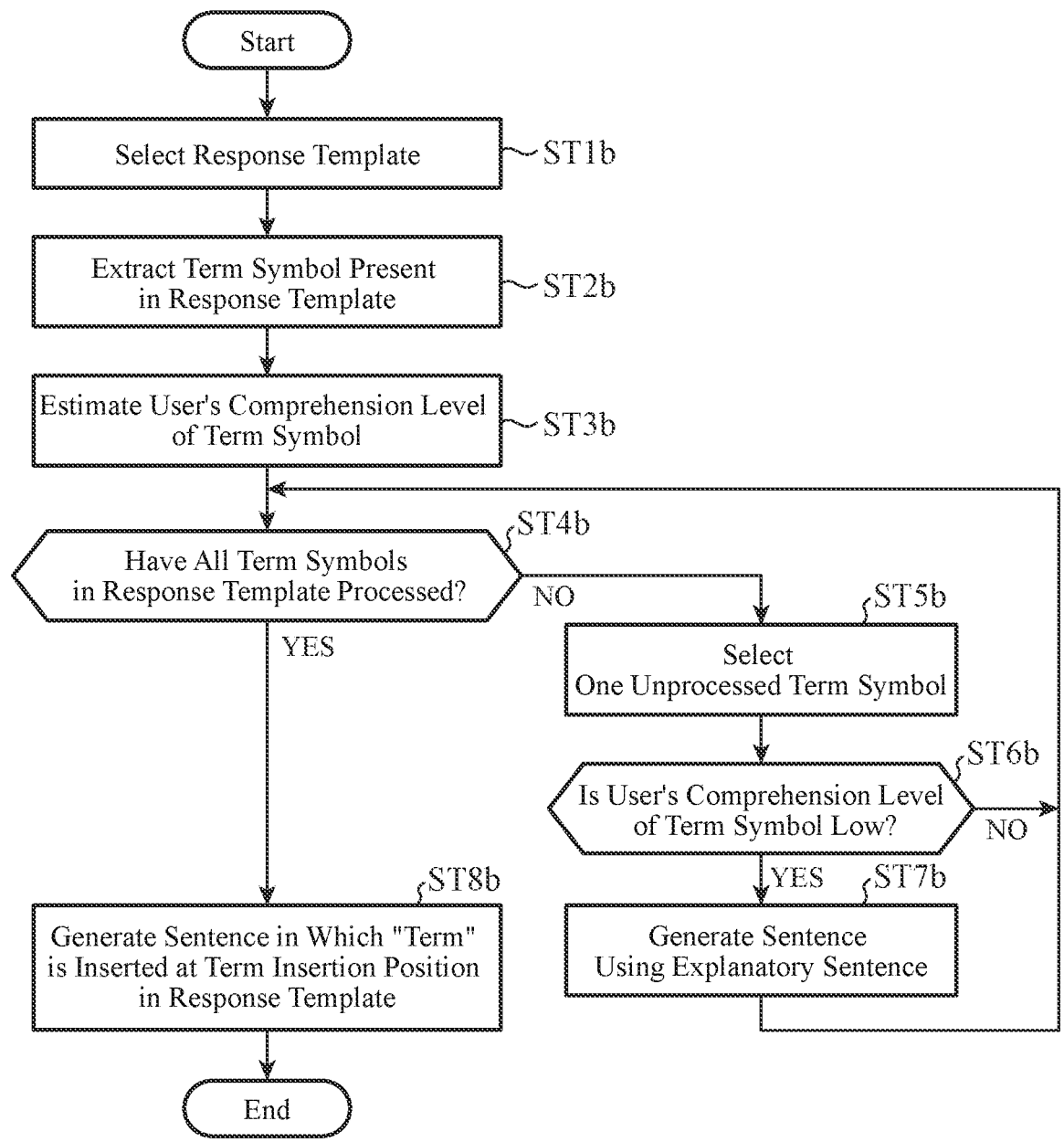
FIG. 9 is a flowchart illustrating an example of specific operation of the response generation device according to the first embodiment.

FIG. 9 is a flowchart illustrating an example of specific operation of the response generation device 3 according to the first embodiment and illustrates a series of processing of generating the response information in step ST4*a*.

In step ST1*b*, the dialog management unit 31 selects a response template B1 of "Would you like {#north up} or {#heading up}?" from among the response templates stored in the response template storing unit 7 as a next dialog scenario.

Subsequently, the dialog management unit 31 extracts the term symbols "#north up" and "#heading up" included in the response template B1 and outputs the term symbols to the comprehension level estimating unit 30 (step ST2b).

Next, the comprehension level estimating unit 30 estimates the user's comprehension level of the term symbol input from the dialog management unit 31 (step ST3b). Details of this processing will be described with reference to FIG. 10. Note that, in this case, since the dialog control system 1 is used by the user for the first time, the frequency data 5B-1 of "#north up" and the frequency data 5B-2 of "#heading up" are in the state of FIG. 3A.

Figure 10:
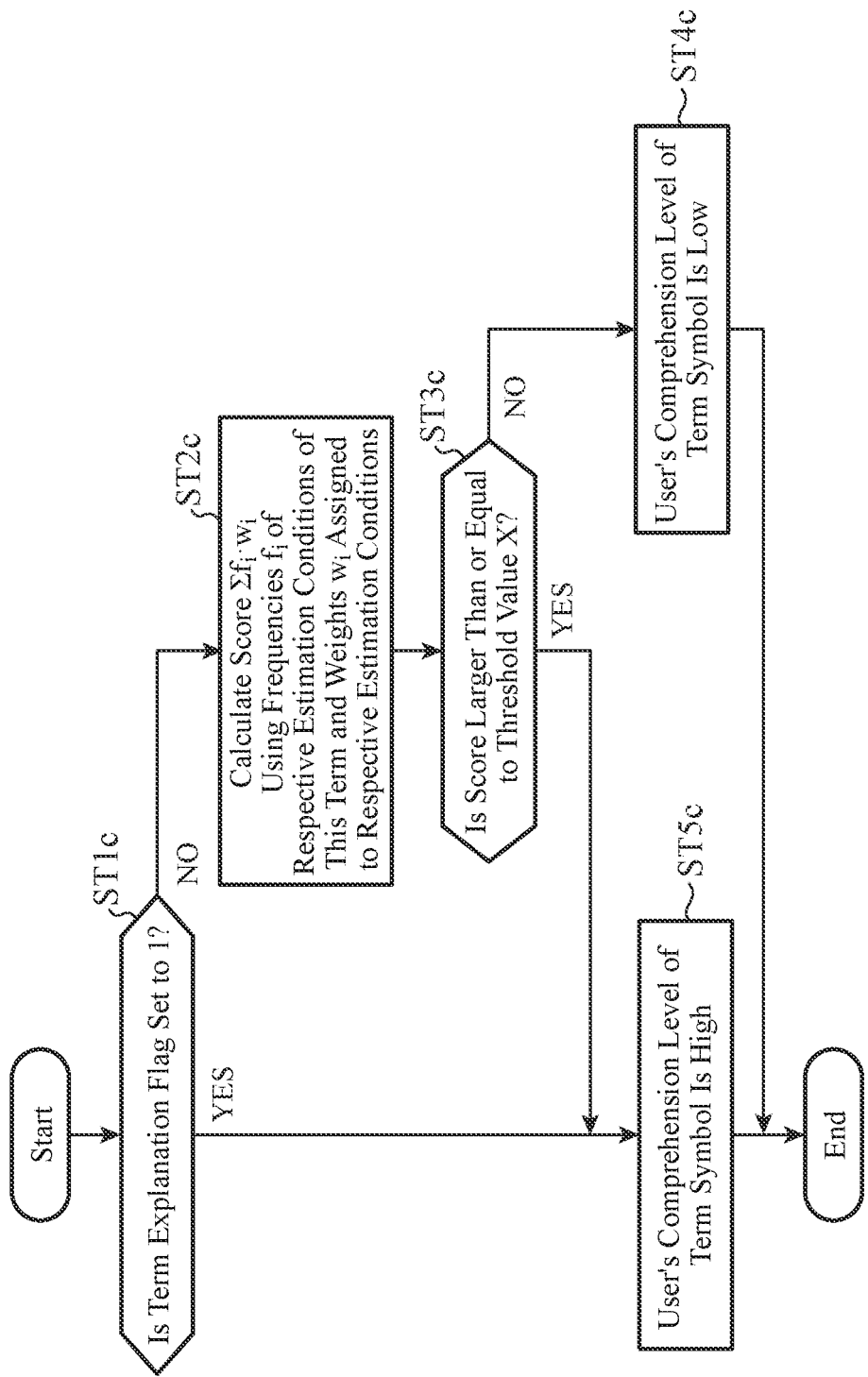
FIG. 10 is a flowchart illustrating specific processing of estimation of a comprehension level of a term.

FIG. 10 is a flowchart illustrating specific processing of estimating a comprehension level of a term, and in step ST3b a series of processing of estimating the user's comprehension level of each term is illustrated. Hereinafter, a case of classifying the user's comprehension level into two levels of high and low is given as an example.

First, the comprehension level estimating unit 30 refers to the term explanation flag and verifies whether 1 is set in the term explanation flag (step ST1c). Since the term explanation flag is 0 herein (step ST1c: NO), the flow proceeds to processing of step ST2c.

In step ST2c, the comprehension level estimating unit 30 reads frequency information corresponding to the term symbol from the frequency information storing unit 5 and specifies frequencies $f_i$ of the respective estimation conditions for the term symbol and weights $w_i$ assigned to the respective estimation conditions. Next, the comprehension level estimating unit 30 calculates $\Sigma f_i \cdot w_i$, which is the sum of values $f_i \cdot w_i$ obtained by multiplying the frequencies $f_i$ by the weights $w_i$ as a score related to the user's comprehension level with respect to the term symbol. Here, since frequencies in the frequency data 5B-1 of "#north up" and the frequency data 5B-2 of "#heading up" are all 0, the score is also 0.0.

Next, the comprehension level estimating unit 30 determines whether the score $\Sigma f_i \cdot w_i$ is larger than or equal to the predetermined threshold value X (step ST3c). Here, the threshold value X is set to 3.00.

Here, the score for "#north up" and the score for "#heading up" are both less than the threshold value X (step ST3c: NO).

In this case, the comprehension level estimating unit 30 determines that the user's comprehension levels with respect to the term symbol "#north up" and the term symbol "#heading up" are both low (step ST4c). The comprehension level estimating unit 30 outputs results of magnitude determination of the scores using such a threshold value X to the dialog management unit 31 as the user's comprehension levels and terminates the processing of FIG. 10.

Upon completion of the processing of FIG. 10, the flow returns to the processing of step ST3b of FIG. 9.

In step ST3b, the dialog management unit 31 acquires the user's comprehension level of the term symbol from the comprehension level estimating unit 30 and then outputs the response template and the user's comprehension level of the term symbol to the response generating unit 32.

Here, in addition to the response template B1, the result of magnitude determination that "the user's comprehension level of #north up is low" and the result of magnitude determination that "the user's comprehension level of #heading up is low" are output to the response generating unit 32 as the user's comprehension levels.

The response generating unit 32 verifies whether generation processing of response information has been executed for all the term symbols included in the response template B1 (step ST4b).

Here, "#north up" and "#heading up" are unprocessed (step ST4b: NO), the response generating unit 32 sequentially selects terms of the unprocessed term symbols in the response template B1 (step ST5b). Here, "#north up" is selected.

Next, on the basis of the user's comprehension level of the term symbols input from the dialog management unit 31, the response generating unit 32 verifies whether the user's comprehension level of the selected term symbol is low (step ST6b). Here, since the result of magnitude determination that "the user's comprehension level of #north up is low" is input from the dialog management unit 31 (step ST6b: YES), the response generating unit 32 generates a sentence using an explanatory sentence of the selected term symbol (step ST7b). Here, since the user's comprehension level of "north up" is low, the response generating unit 32 generates a sentence of "North up is map display with the north arranged upward.".

Subsequently, since the result of magnitude determination that "the user's comprehension level of #heading up is low" has been input as for "#heading up" from the dialog management unit 31, the processing from step ST4b to step ST7b is sequentially executed.

As a result, the response generating unit 32 generates a sentence of "Heading up is map display with a travelling direction arranged upward.".

Since the generation processing of response information has been executed for all the term symbols (step ST4b: YES), the response generating unit 32 generates a sentence in which corresponding terms are inserted to term insertion positions of the response template B1 (step ST8b).

In this case, a response sentence of "Would you like north up or heading up?" in which the terms corresponding to "#north up" and "#heading up" included in the response template B1 are set is generated. As a result, the processing of FIG. 9 is terminated, and the flow returns to the processing of step ST5a of FIG. 7.

In step ST5a of FIG. 7, the output unit 4 presents the response sentence to the user.

Here, a selection screen of "North up is map display with the north arranged upward. Heading up is map display with a travelling direction arranged upward. Would you like north up or heading up?" is displayed on the monitor 104.

Furthermore, a speech of "North up is map display with the north arranged upward. Heading up is map display with a travelling direction arranged upward. Would you like north up or heading up?" is output from the speaker 103.

Subsequently, in step ST6a, since the dialog terminating processing C0 illustrated in FIG. 8 is selected, the flow returns to the processing of step ST2a.

In step ST2a, the user understands that the term "north up" means "map display with the north arranged upward" from the response sentence presented from the output unit 4.

Then, when the user utters "north up" or presses a selection button of "north up" using the manual operation input unit 20, the dialog management unit 31 specifies the function A1-1 illustrated in FIG. 8 (step ST3a).

Next, in step ST4a, since the term explanation flag of "#north up" is 1, the dialog management unit 31 assumes that the user understands "#north up" and selects a response template B2 of "North up is selected.". Then, the response generating unit 32 generates a response sentence of "North up is selected.".

In step ST5a, the output unit 4 presents the response sentence of "North up is selected" to the user. In the function A1-1 of changing the orientation of a map to north up, dialog terminating processing C1 illustrated in FIG. 8 is set (step ST6a: YES). In the dialog terminating processing C1, processing of "Set (map orientation, north up)" is set, and changing the orientation of the map to north up terminates the dialog.

Therefore, in step ST7a, a function executing unit (not illustrated) executes the function of changing the orientation of the map to north up, whereupon the flow proceeds to step ST8a.

When the orientation of the map is allowed to be north up, the dialog management unit 31 adds 1 to the frequency $f_2$ of the estimation condition of condition number 2 in the frequency data 5B-1 (step ST8a).

In addition, in step ST8a, the dialog management unit 31 may also update, for a term symbol corresponding to a function in an exclusive relation with the function a command of which has been executed in step ST7a, the frequency of an estimation condition the weight $w_i$ of which is smaller than that of the estimation condition under which the function has been executed.

Note that functions in an exclusive relation refer to functions that are related to each other and cannot be executed simultaneously.

For example, north up and heading up are related as functions of indicating the orientation of a map and cannot be executed simultaneously and thus are in an exclusive relation. In the case where north up is designated under the estimation condition of condition number 2 and a command is executed, the dialog management unit 31 adds +1 to the frequency $f_3$ for the estimation condition of condition number 3 in the frequency data 5B-2 also for heading up.

Meanwhile, in the case where the user utters "north up" under the estimation condition of condition number 2 after outputting speech guidance including the term "north up" and the term "heading up", from the perspective of heading up, this meets the estimation condition of condition number 3 in which a term other than heading up is uttered.

In this manner, when a certain function is executed, by sequentially updating the frequencies of the executed function and a function in an exclusive relation with the executed function, the user's comprehension level of the term symbol is estimated by using the frequency data.

On the other hand, in the case where the dialog control system 1 has been used multiple times by the user, the dialog management unit 31 sets the term explanation flag to 0 (step ST1a), and then proceeds to step ST2a to enter a stand-by state for speech input or input by manual operation.

When the user presses "map operation" of a software button in step ST2a, the dialog management unit 31 selects the response template B0 corresponding to a next dialog state for the function A0 from among the response templates stored in the response template storing unit 7 and outputs the response template B0 to the response generating unit 32. The response generating unit 32 generates a response sentence on the basis of the response template B0. As a result, for example, a response sentence of "Changing scales, changing the map orientation, changing maps, or others can be selected" is generated and output to the output unit 4.

The output unit 4 displays options such as "changing scales", "changing the map orientation", "changing maps" on the monitor 104 and synthesizes a speech of the response sentence of "Changing scales, changing the map orientation, changing maps, or others can be selected" and outputs the speech from the speaker 103.

Here, it is assumed that "changing the map orientation" is designated by the user's operation input. In this case, the processing from step ST2a to step ST3a is executed, and two keywords of "north up" and "heading up" representing functions A1-1 and A1-2 that can make a transition from the function A1 intended by the user are displayed on the screen of the monitor 104.

Subsequently, generation processing of response information is executed in step ST4a, details of which will be described again with reference to FIG. 9.

In step ST1b, the dialog management unit 31 selects a response template B1 of "Would you like {#north up} or {#heading up}?" from among the response templates stored in the response template storing unit 7 as a next dialog scenario.

Subsequently, the dialog management unit 31 extracts the term symbols "#north up" and "#heading up" included in the response template B1 and outputs the term symbols to the comprehension level estimating unit 30 (step ST2b). In step ST3b, the comprehension level estimating unit 30 estimates the user's comprehension level of the term symbol input from the dialog management unit 31.

Details of this processing will be described again with reference to FIG. 10. Here, it is assumed that the frequency data 5B-1 of "#north up" and the frequency data 5B-2 of "#heading up" are in the state of FIG. 3B.

In step ST1c, the comprehension level estimating unit 30 refers to the term explanation flag and verifies whether 1 is set in the term explanation flag. Since the term explanation flag is 0 here (step ST1c: NO), the flow proceeds to processing of step ST2c.

In step ST2c, the comprehension level estimating unit 30 reads frequency information corresponding to the term symbol from the frequency information storing unit 5 and specifies frequencies $f_i$ of the respective estimation conditions for the term symbol and weights $w_i$ assigned to the respective estimation conditions.

Next, the comprehension level estimating unit 30 calculates $\Sigma f_i \cdot w_i$, which is the sum of values $f_i \cdot w_i$ obtained by multiplying the frequencies $f_i$ by the weights $w_i$ as a score related to the user's comprehension level of the term symbol.

Here, since the frequency data 5B-1 and the frequency data 5B-2 are in the state of FIG. 3B, a score for the term symbol "#north up" is calculated to be 5.8 while a score for the term symbol "#heading up" is calculated to be 1.9.

Subsequently, the comprehension level estimating unit 30 determines whether the score $\Sigma f_i \cdot w_i$ is larger than or equal to the predetermined threshold value X (step ST3c). Here, the threshold value X is set to 3.00.

Here, the score for "#north up" is larger than or equal to the threshold value X (step ST3c: YES) while the score for "#heading up" is less than the threshold value X (step ST3c: NO).

From a result of comparison between the scores and the threshold value X, the comprehension level estimating unit 30 determines that the user's comprehension level of the term symbol "#north up" is high (step ST5c) while determining that the user's comprehension level of the term symbol "#heading up" is low (step ST4c).

The comprehension level estimating unit 30 outputs results of magnitude determination of the scores to the dialog management unit 31 as the user's comprehension levels of the term symbol and terminates the processing of FIG. 10.

Upon completion of the processing of FIG. 10, the flow returns to the processing of step ST3b of FIG. 9.

In step ST3b, the dialog management unit 31 acquires the user's comprehension level of the term symbol from the comprehension level estimating unit 30 and then outputs the response template and the user's comprehension level of the term symbol to the response generating unit 32.

Here, in addition to the response template B1, the result of magnitude determination that "the user's comprehension level of #north up is high" and the result of magnitude determination that "the user's comprehension level of #heading up is low" are output to the response generating unit 32 as the user's comprehension levels.

The response generating unit 32 verifies whether generation processing of response information has been executed for all the term symbols included in the response template B1 (step ST4b).

Here, "#north up" and "#heading up" are unprocessed (step ST4b: NO), the response generating unit 32 sequentially selects terms of the unprocessed term symbols in the response template B1 (step ST5b). Here, "#north up" is selected.

Next, on the basis of the user's comprehension level of the term symbols input from the dialog management unit 31, the response generating unit 32 verifies whether the user's comprehension level of the selected term symbol is low (step ST6b). Here, since the result of magnitude determination that "the user's comprehension level of #north up is high" is input from the dialog management unit 31 (step ST6b: NO), the response generating unit 32 proceeds to the processing of step ST4b.

Since the term symbol "#heading up" is unprocessed (step ST4b: NO), the flow proceeds to the processing of step ST5b.

Here, since the result of magnitude determination that "the user's comprehension level of #heading up is low" has been input from the dialog management unit 31, the processing from step ST5b to step ST7b is executed. As a result, the response generating unit 32 generates a sentence of "Heading up is map display with a travelling direction arranged upward.". Thereafter, the flow proceeds to processing of step ST4b.

Since the generation processing of response information has been executed for all the term symbols (step ST4b: YES), the response generating unit 32 generates a sentence in which corresponding terms are inserted to term insertion positions of the response template B1 (step ST8b).

In this case, a response sentence of "Would you like north up or heading up?" in which the terms corresponding to "#north up" and "#heading up" included in the response template B1 are set is generated.

As a result, a sentence of "Heading up is map display with a travelling direction arranged upward. Would you like north up or heading up?" is generated.

Thereafter, the processing of FIG. 9 is terminated, and the flow returns to the processing of step ST5a of FIG. 7.

In step ST5a of FIG. 7, the output unit 4 presents the sentence generated by the response generating unit 32 to the user. Here, a selection screen of "Heading up is map display with a travelling direction arranged upward. Would you like north up or heading up?" is displayed on the monitor 104.

Furthermore, a speech of "Heading up is map display with a travelling direction arranged upward. Would you like north up or heading up?" is output from the speaker 103.

Subsequently, in step ST6a, since the dialog terminating processing C0 illustrated in FIG. 8 is selected, the flow returns to the processing of step ST2a.

In step ST2a, the user understands that "north up" is a function often used, and in addition to this, that "heading up" means "map display with a travelling direction arranged upward" from the sentence presented from the output unit 4.

Then, when the user utters "north up" or presses a selection button of "north up" using the manual operation input unit 20, the processing from step ST3a to step ST7a is executed. Then, the function executing unit (not illustrated) executes a function of changing the orientation of the map to north up, whereupon the flow proceeds to step ST8a.

In the case where north up is designated by a speech in the above dialog, the dialog management unit 31 adds +1 to the frequency $f_2$ of the estimation condition of condition number 2 in the frequency data 5B-1 (step ST8a). Furthermore, for the term symbol "#heading up", the dialog management unit 31 adds +1 to the frequency $f_3$ of the estimation condition of condition number 3 in the frequency data 5B-2.

When north up is designated by pressing the selection button of "north up" on the selection screen, the dialog management unit 31 adds +1 to the frequency $f_4$ of the estimation condition of condition number 4 in the frequency data 5B-1. The dialog management unit 31 further adds +1 to the frequency $f_3$ of the estimation condition of condition number 3 in the frequency data 5B-2 for "#heading up".

In such a dialog state for designating one of a plurality of functions that are related to each other but in an exclusive relation, a term corresponding to another function out of the plurality of functions may also be presented to the user in many cases. In this case, in the case where the user's comprehension level of the term corresponding to the other function is low, an explanatory sentence of the term corresponding to this function is also presented to the user.

That is, regarding a term corresponding to a function not executed, among terms corresponding to the plurality of functions, response information that facilitates the user's understanding is presented.

Thus, by updating the frequency even when the other function is not executed as described above, for the term comprehension of which of the user has been obtained among the terms corresponding to the plurality of functions, response information including an explanatory sentence is no longer presented also for the other function which has not been executed.

This shortens time for generating the response information including the explanatory sentence of the term, thereby enabling efficient dialog depending on the user's comprehension of the term.

As described above, in the response generation device 3 according to the first embodiment, the dialog management unit 31 selects a response template corresponding to a dialog state with a user from among response templates corresponding to predetermined dialog states and outputs a term symbol included in the selected response template. The comprehension level estimating unit 30 specifies frequencies and the weights of the respective estimation conditions of a function corresponding to a term symbol input from the dialog management unit 31 by referring to the estimation condition table 5A and the frequency table 5B and outputs a result of magnitude determination of a score calculated from the specified frequencies and the weights to the dialog management unit 31 as the user's comprehension level of the term symbol. The response generating unit 32 generates a response sentence in the dialog state with the user on the basis of the response template selected by the dialog management unit 31, adds an explanatory sentence of the term symbol to the response sentence depending on the user's comprehension level of the term symbol input from the dialog management unit 31, and outputs the response sentence. In this manner, the comprehension level of the user of a term presented in a dialog with the user is estimated, and an explanatory sentence is added to a response sentence depending on the comprehension level, and thus it is possible to appropriately facilitate the user's comprehension of the term used in the dialog.

Furthermore, in the response generation device 3 according to the first embodiment, the comprehension level estimating unit 30 calculates the sum $\Sigma f_i \cdot w_i$ of values $f_i \cdot w_i$ obtained by multiplying each of the frequencies $f_i$ and the weights $w_i$ that are specified for respective estimation conditions as a score. As a result, it is possible to estimate an accurate comprehension level in accordance with a dialog history with the user.

Furthermore, in the response generation device 3 according to the first embodiment, the response generating unit 32 generates and outputs a sentence in which an explanatory sentence is not added to the response sentence for the term symbol for which a comprehension level of the user is high and an explanatory sentence is added to the response sentence for the term symbol for which a comprehension level of the user is low.

As a result, since the sentence in which an explanatory sentence is added to the response sentence depending on the user's comprehension level of the term symbol, it is possible to appropriately facilitate the user's comprehension of the term used in the dialog.

Furthermore, in the response generation device 3 according to the first embodiment, the response generating unit 32 generates a sentence in which an explanatory sentence is added before or after the response sentence for a term symbol for which a comprehension level of the user is low. Especially regarding a term a comprehension level of which of the user is low, by generating a sentence in which an explanatory sentence of the term is followed by the response sentence, the user can understand the term included in the response sentence and thereby perform operation corresponding to the response sentence.

Furthermore, in the response generation device 3 according to the first embodiment, the response generating unit 32 generates the response sentence in which a term is set to a term symbol for which a comprehension level of the user is high and generates the response sentence in which an explanatory sentence is set to a term symbol for which a comprehension level of the user is low. In this manner, since the sentence in which an explanatory sentence of a term is added to content of the response sentence depending on the user's comprehension level of the term symbol, it is possible to appropriately facilitate the user's comprehension of the term used in the dialog.

Furthermore, in the response generation device 3 according to the first embodiment, in a case where one of a plurality of functions in an exclusive relation, in which the plurality of functions are related to each other and cannot be executed simultaneously, is executed, the dialog management unit 31 updates the frequency of the estimation condition under which the function is executed for the term symbol corresponding to the executed function and also updates, for a term symbol corresponding to a function which is in the exclusive relation and has not been executed, the frequency of an estimation condition the weight of which is smaller than that of the estimation condition under which the function has been executed.

As the user's comprehension of terms corresponding to a plurality of functions, which are related to each other and cannot be executed simultaneously, is obtained in the above manner, accordingly, response information including the explanatory sentence of the term is no longer presented. As a result, as comprehension of the user of the terms corresponding to the plurality of functions is obtained, dialog time is also shortened, thereby enabling efficient dialog to be performed.

Second Embodiment

Figure 11:
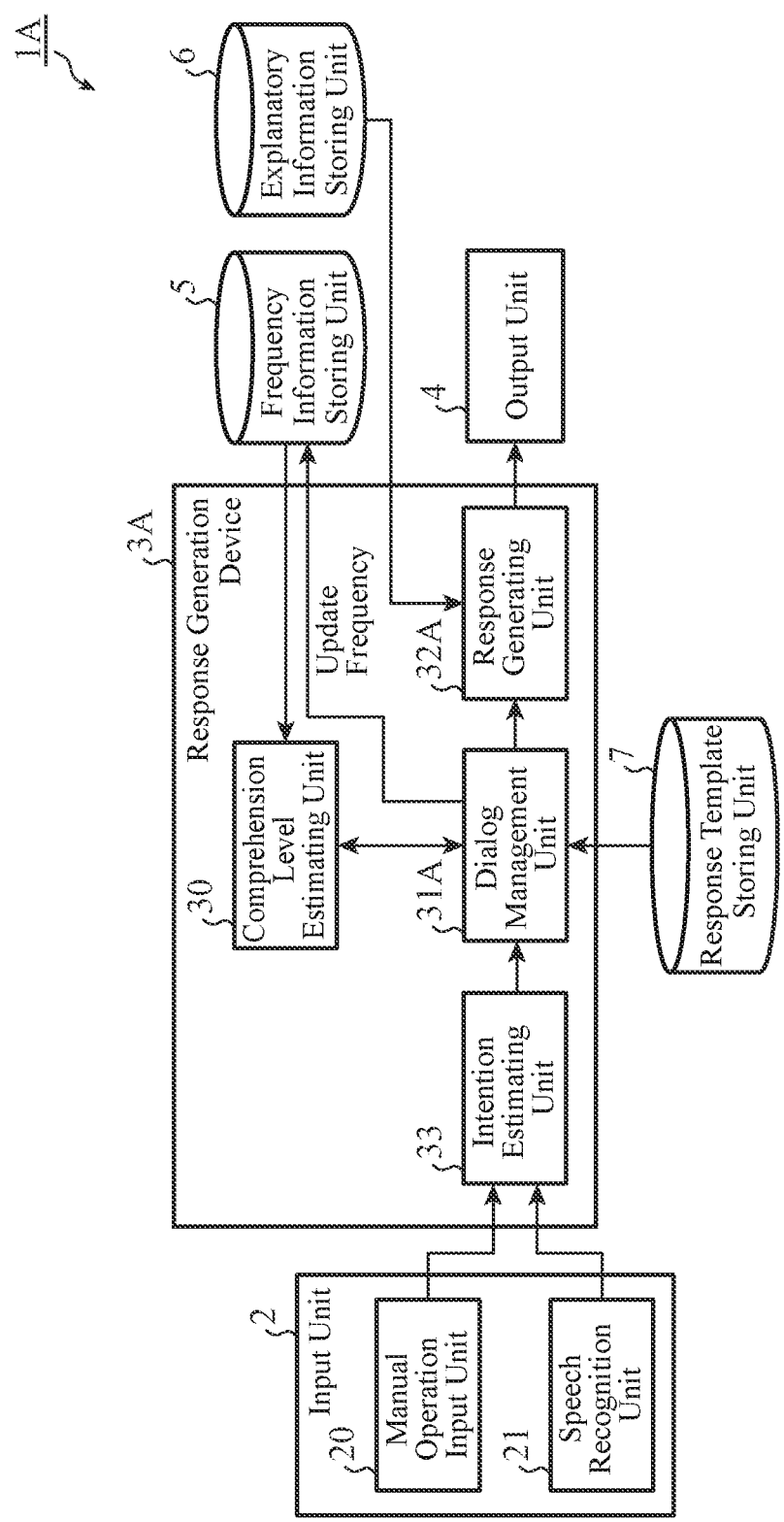
FIG. 11 is a block diagram illustrating a configuration of a dialog control system according to a second embodiment of the invention.

FIG. 11 is a block diagram illustrating a configuration of a dialog control system 1A according to a second embodiment of the invention. In FIG. 11, the same component as that in FIG. 1 is denoted with the same symbol and descriptions thereon are omitted. Like the dialog control system 1 described in the first embodiment, the dialog control system 1A controls input and output of information in a dialog with a user, and includes an input unit 2, a response generation device 3A, an output unit 4, a frequency information storing unit 5, an explanatory information storing unit 6, and a response template storing unit 7.

The response generation device 3A generates a response sentence presented in a dialog with a user, and includes a comprehension level estimating unit 30, a dialog management unit 31A, a response generating unit 32A, and an intention estimating unit 33.

In addition to similar functions to those of the dialog management unit 31 described in the first embodiment, the dialog management unit 31A selects a response template corresponding to a dialog state for designating a function estimated by the intention estimating unit 33 from response templates stored in the response template storing unit 7.

In addition to similar functions to those of the response generating unit 32 described in the first embodiment, the response generating unit 32A generates response information in consideration of the length of a sentence to be presented to the user.

For example, in a case where the length of a sentence in which an explanatory sentence of a term is inserted at a term insertion position of a response template is greater than or equal to a threshold value, the response generating unit 32A generates a sentence in which the content of the response sentence is divided into sentences each having a length less than the threshold value. Examples of this sentence include a sentence including a response sentence in which a term is inserted at a term insertion position and an explanatory sentence of the term.

The intention estimating unit 33 estimates a function that the user intends to execute on the basis of the input information of the user accepted by the input unit 2.

For example, by preparing pairs of a correct intended function and an uttered exemplary sentence designating this function and using machine learning such as the maximum entropy method, a function that the user intends to execute is estimated from user's free utterance.

Note that the functions of the comprehension level estimating unit 30, the dialog management unit 31A, the response generating unit 32A, and the intention estimating unit 33 are implemented by a processing circuit.

In the case where the processing circuit is the processing circuit 100 of dedicated hardware illustrated in FIG. 5A, the processing circuit 100 corresponds to, for example, a single circuit, a composite circuit, a programmed processor, a parallel programmed processor, an ASIC, an FPGA, or a combination thereof.

Moreover, when the processing circuit is the CPU 105 illustrated in FIG. 5B, the functions of the comprehension level estimating unit 30, the dialog management unit 31A, the response generating unit 32A, and the intention estimating unit 33 are implemented by software, firmware, or a combination of software and firmware.

Next, the operation will be described.

Figure 12:
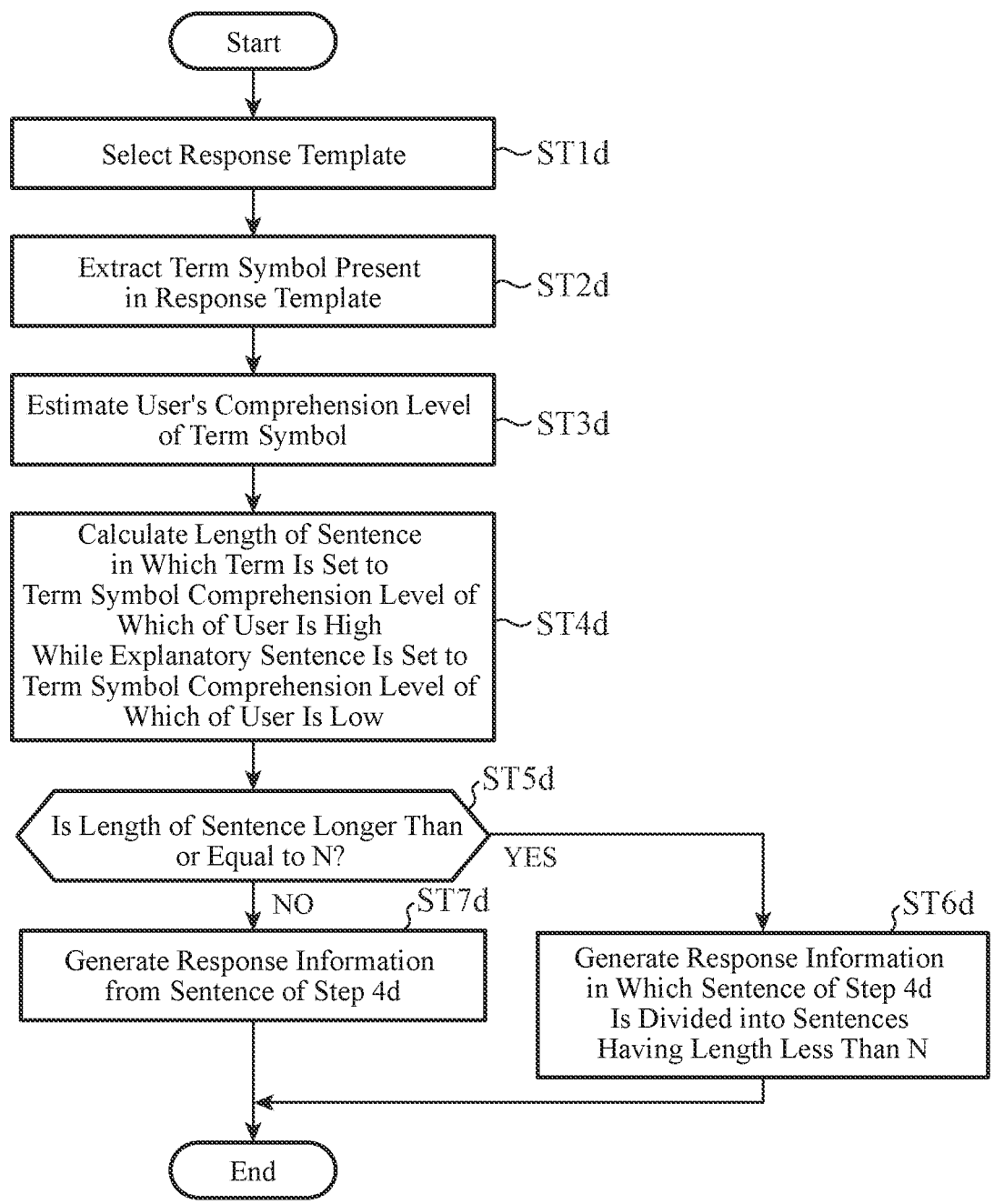
FIG. 12 is a flowchart illustrating specific operation of a response generation device according to the second embodiment.

FIG. 12 is a flowchart illustrating the operation of the dialog control system 1A according to the second embodiment and illustrates a series of processing executed through a dialog with a user.

Unlike the first embodiment, in the second embodiment, assuming that input of free utterance is accepted and that the intention estimating unit 33 can estimate a function to be executed from the content of the utterance, the following operations will be described. Also in the second embodiment, it is assumed that the user's utterance is correctly recognized without erroneous recognition. Furthermore, it is assumed that a dialog is initiated by using an utterance start button not illustrated. Hereinafter, like in the first embodiment, the case where the user uses the dialog control system 1A for the first time and the case where the user has used the dialog control system 1A multiple times and frequency data is accumulated will be described. Note that in this case it is assumed that a user engaged in a dialog inputs the user's own identification information using the input unit 2 and that the user is thereby identified on the dialog control system 1A side.

In the case where the dialog control system 1A is used for the first time by the user, like in the first embodiment, when "changing the map orientation" of a software button is pressed, two terms (keywords) of "north up" and "heading up" are displayed on a screen of the monitor 104. Thereafter, the flow advances to response information generating processing of FIG. 12.

In step ST1d of FIG. 12, like in step ST1b, the dialog management unit 31A may specify a function intended by the user and select a response template corresponding to a dialog state to follow subsequently from this function. Moreover, steps ST2d and ST3d are similar to the processing of steps ST2b and ST3b illustrated in FIG. 9, and thus descriptions thereof will be omitted.

Through the series of processing, the dialog management unit 31A outputs, to the response generating unit 32A, the response template B1, the result of magnitude determination that "the user's comprehension level of #north up is low" and the result of magnitude determination that "the user's comprehension level of #heading up is low".

In step ST4d, the response generating unit 32A reads explanatory sentences of the term symbol "#north up" and the term symbol "#heading up" from the explanatory information storing unit 6.

Since the user's comprehension level of the term symbol "#north up" and the term symbol "#heading up" included in the response template B1 is low, the response generating unit 32A generates a response sentence in which the explanatory sentence is set to the term symbol and calculates the length of the generated response sentence.

In this case, the number of characters of the two parts "ni shi ma su ka (Would you like)", which are parts of the response template B1 excluding the term symbols, and the number of characters of the respective explanatory sentences of the terms "north up" and "heading up" are calculated, and these numbers of characters are totaled.

As a result, the length of the response sentence in which the explanatory sentences are set to the term symbols of the response template B1 is calculated. In the above example, the number of characters of the part "ni shi ma su ka (Would you like)" is 5, the number of characters of the explanatory sentence "kita ga ue ni na ru chi zu hyo ji (map display with the north arranged upward)" of the term "north up" is 10, and the number of characters of the explanatory sentence "shin kou hou kou ga ue ni na ru chi zu hyo ji (map display with a travelling direction arranged upward)" of the term "heading up" is 13, the length of the response sentence totals 33 (=5+5+10+13).

Next, the response generating unit 32A determines whether the length of the response sentence is larger than or equal to a threshold value N (step ST5d). If the response sentence is too long when the response sentence generated on the basis of the response template is audibly or visually presented, there is a possibility that the user cannot immediately recognize the content of the response sentence. Therefore, as the threshold value N, an upper limit value within a range of lengths of a sentence which is predicted not to disturb recognition of the user is set.

In this case, the length of the response sentence is 33, which is larger than or equal to the threshold value N (=30) (step ST5d: YES). Here, the response generating unit 32A generates a sentence D3 illustrated in FIG. 13, for example, as response information (step ST6d).

Figure 13:
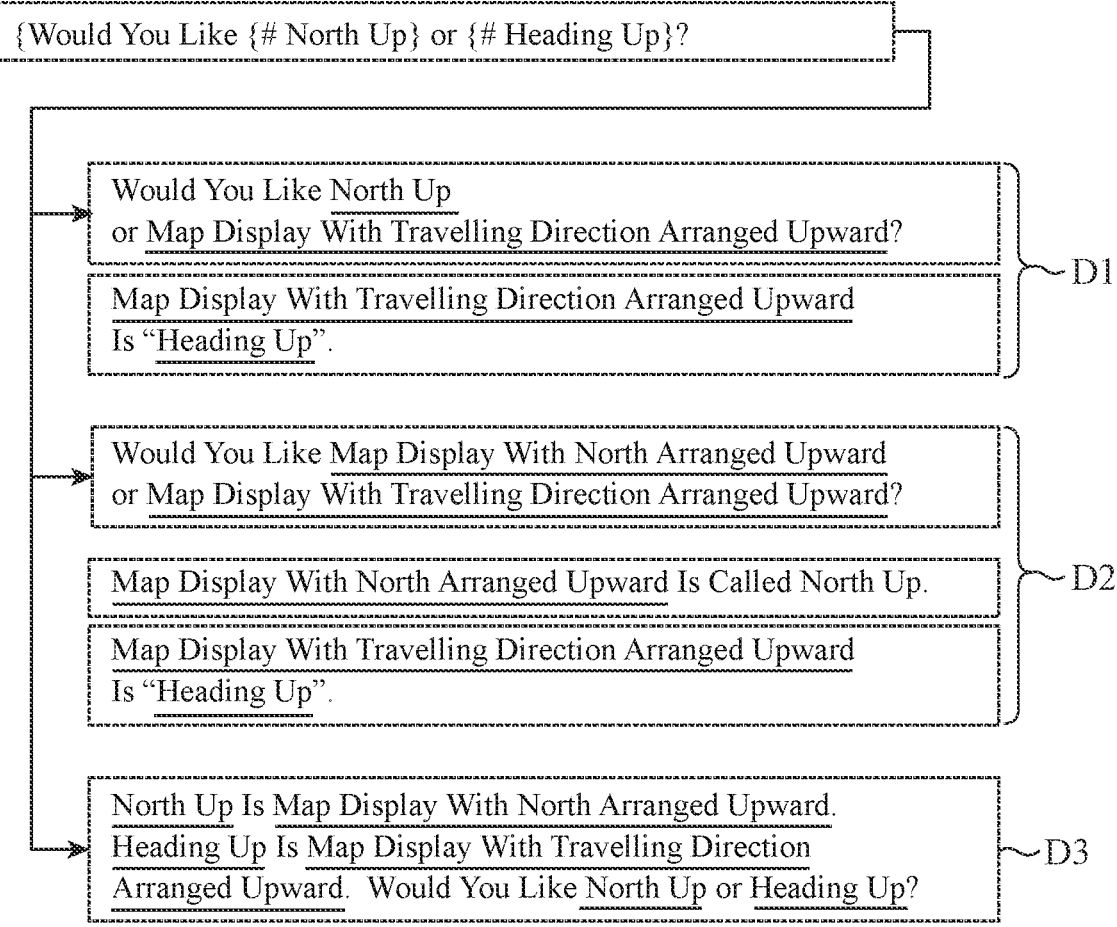
FIG. 13 is a diagram illustrating specific examples of response templates and response information according to the second embodiment.

In FIG. 13, the sentence D3 is "North up is map display with the north arranged upward. Heading up is map display with a travelling direction arranged upward. Would you like north up or heading up?", and a template having the form of "{#term symbol=term} means {#term symbol=explanatory sentence of the term}." is prepared.

The response generating unit 32A sets the corresponding term or the explanatory sentence to the term symbols in the above template, thereby generating a sentence of "no su a ppu wa ki to ga u e ni na ru chi zu hyo ji de su (North up is map display with the north arranged upward)" containing nineteen characters and a sentence of "he di nn gu a ppu wa shi n kou hou kou ga u e ni na ru chi zu hyo ji de su (Heading up is map display with a travelling direction arranged upward)" containing 24 characters.

Furthermore, the response generating unit 32A sets the terms corresponding to the term symbols of the response template B1, thereby generating the response sentence of "no su a ppu ni shi ma su ka, he di nn gu a ppu ni shi ma su ka (Would you like north up or heading up)" containing 24 characters. The sentence D3 generated in this manner is output from the response generating unit 32A to the output unit 4 as response information. Then, the output unit 4 outputs a speech and displays a screen.

When the sentence D3 of "North up is map display with the north arranged upward. Heading up is map display with a travelling direction arranged upward. Would you like north up or heading up?" is output by speech, the user understands that the term "north up" is "map display with the north arranged upward".

When the user utters "north up" or presses a selection button of "north up" using the manual operation input unit 20, the processing from step ST3a to step ST7a of FIG. 7 is executed. Then, the function executing unit (not illustrated) executes a function of changing the orientation of the map to north up, whereupon the flow proceeds to step ST8a of FIG. 7.

In the case where north up is designated by a speech in the above dialog, the dialog management unit 31A adds +1 to the frequency $f_2$ of the estimation condition of condition number 2 in the frequency data 5B-1 (step ST8a). Furthermore, for the term symbol "#heading up", the dialog management unit 31A adds +1 to the frequency $f_3$ of the estimation condition of condition number 3 in the frequency data 5B-2.

When north up is designated by pressing the selection button of "north up" on the selection screen, the dialog management unit 31A adds +1 to the frequency $f_4$ of the estimation condition of condition number 4 in the frequency data 5B-1. The dialog management unit 31A further adds +1 to the frequency $f_3$ of the estimation condition of condition number 3 in the frequency data 5B-2 for "#heading up".

In this manner, when a certain function is executed, by sequentially updating the frequencies of the executed function and a function in an exclusive relation with the executed function, the user's comprehension level of the term symbol is estimated by using the frequency data.

On the other hand, in the case where the dialog control system 1A is used multiple times by the user, as described above, when "changing the map orientation" of a software button is pressed, two terms (keywords) of "north up" and "heading up" are displayed on a screen of the monitor 104. Thereafter, the flow advances to response information generating processing of FIG. 12.

By the series of processing from step ST1$d$ to step ST3$d$ of FIG. 12, the dialog management unit 31A outputs, to the response generating unit 32A, the response template B1, the result of magnitude determination that "the user's comprehension level of #north up is high" and the result of magnitude determination that "the user's comprehension level of #heading up is low".

In step ST4$d$, on the basis of the information input from the dialog management unit 31A, the response generating unit 32A reads the term of the term symbol "#north up" and the explanatory sentence of the symbol "#heading up" from the explanatory information storing unit 6.

The response generating unit 32A generates the number of characters of the two parts "ni shi ma su ka (Would you like)", which are parts of the response template B1 excluding the term symbols, the number of characters of the term "north up", and the number of characters of the explanatory sentence of the term "heading up" are calculated, and these numbers of characters are totaled.

As a result, the length of the response sentence in which the explanatory sentence of the term is set to the term symbol of the response template B1 is calculated. In this case, the number of characters of the part "ni shi ma su ka (Would you like)" is 5, the number of characters of the term "no su a ppu (north up)" is 6, and the number of characters of the explanatory sentence "shin kou hou kou ga u e ni na ru chi zu hyo ji (map display with a travelling direction arranged upward) of the term "heading up" is 13, the length of the response sentence totals 29 (=5+5+6+13).

Next, the response generating unit 32A determines whether the length of the response sentence is larger than or equal to a threshold value N (step ST5$d$). Here, the length of the response sentence is 29 and is less than the threshold value N (=30) (step ST5$d$: NO). Here, the response generating unit 32A generates a sentence D1 illustrated in FIG. 13, for example, as response information (step ST6$d$).

Further, in preparation for the case where the user continues utterance similar to "map display with a travelling direction arranged upward" such as "traveling direction in the top" or "map in the traveling direction" and thereby designates "heading up", the response generating unit 32A also generates a sentence "Map display with a travelling direction arranged upward is heading up." in advance.

When the sentence D1 of "Would you like north up or map display with a travelling direction arranged upward?" is output by speech, the user understands that "north up" is a function often used and that there is map display with a travelling direction arranged upward in addition to that.

When the user utters "map with a traveling direction arranged upward", the processing from step ST3$a$ to step ST7$a$ of FIG. 7 is executed. Then, the function executing unit (not illustrated) executes a function of changing the orientation of the map to north up, whereupon the flow proceeds to step ST8$a$ of FIG. 7.

If a map in which the traveling direction is directed upward is designated by a speech in the above dialog, the intention estimating unit 33 is estimated that the function that the user intends to execute is "heading up".

At this time, the dialog management unit 31A adds +1 to the frequency $f_2$ of the estimation condition of condition number 2 in the frequency data 5B-2 (step ST8$a$). Furthermore, also for the term symbol "#north up", the dialog management unit 31A adds +1 to the frequency $f_3$ of the estimation condition of condition number 3 in the frequency data 5B-1.

In addition, as described above, in the case where a function is designated by a speech such as "map with a traveling direction arranged upward" without using the term symbol "#heading up", as a sentence that connects the description of the designated function and the term, the response generating unit 32A additionally outputs the aforementioned sentence of "Map display with a travelling direction arranged upward is heading up." to the output unit 4. As a result, the output unit 4 presents the sentence D2 to the user.

In the case where the function is executed by designating the explanatory sentence in this manner, by additionally presenting to the user a sentence in which a term corresponding to this function is associated with an explanatory sentence thereof, it is also possible to appropriately facilitate the user's comprehension of the term.

As described above, in the response generation device 3A according to the second embodiment, in a case where the generated sentence has a length greater than or equal to the predetermined threshold value N, the response generating unit 32A divides the sentence into a plurality of sentences each having a length less than the threshold value N and outputs the sentences. In this manner, it is possible to present response information that the user can easily recognize.

The response generation device 3A according to the second embodiment further includes the intention estimating unit 33 that estimates a function that the user intends to execute on the basis of the input information. As a result, even in the case where a content similar to a term or an explanatory sentence included in the response sentence is uttered by the user, the function can be estimated from the content of the utterance.

Furthermore, in the response generation device 3A according to the second embodiment, the response generating unit 32A generates and outputs a sentence including the term symbol and an explanatory sentence in a case where a function corresponding to the term symbol is executed by the user without using the term symbol.

Since the sentence generated in this manner is presented, the user can understand the term corresponding to the executed function.

In particular, although the intention estimating unit 33 can estimate the function from various pieces of utterance content by the user, the reliability of the function estimated from the utterance content is low. Therefore, by presenting a sentence including a term and an explanatory sentence, the possibility that the user uses the term representing the function in a dialog is increased thereafter. This can improve the reliability of the function estimated by the intention estimating unit 33.

Moreover, although the case, where the intention estimating unit 33 estimates the function corresponding to the term symbol when the term symbol is not used by the user, has been described; however, the present invention is not limited thereto. For example, when the user executes the function corresponding to the term symbol by manual operation by using the manual operation input unit 20 without uttering the term symbol, the dialog management unit 31A recognizes that the function corresponding to the term symbol has been executed and notifies this fact to the response generating unit 32A. As a result, the response generating unit 32A generates and outputs a sentence including the term symbol and the explanatory sentence.

That is, since the estimation by the intention estimating unit 33 is not required, in the case where the dialog management unit 31 of the first embodiment can recognize that the user has executed the function corresponding to the term symbol without using the term symbol, the response generating unit 32 of the first embodiment may generate a sentence including the term symbol and the explanatory sentence.

Note that, in the first embodiment and the second embodiment, the weight $w_i$ assigned to the estimation conditions in the estimation condition table 5A is a constant value irrespective of the lapse of time.

However, under an estimation condition that a function is not designated even after a certain period of time elapses, there is a possibility that the user has forgotten the content of a term presented in a dialog state indicated by the estimation condition, and thus it is necessary to let the user understand the term again.

Therefore, in the estimation condition table 5A, the dialog management unit 31 or the dialog management unit 31A may reduce the weight $w_i$ for an estimation condition exceeding a threshold value of time elapsed after updating the frequency $f_i$ last time. For example, a plurality of threshold values of time elapsed is prepared, and the weight $w_i$ is stepwise or gradually reduced each time a threshold value of time elapsed is exceeded.

In this manner, the user's comprehension level of a term symbol decreases under an estimation condition that does not follow often in the dialog with the user, and thus a response sentence added with an explanatory sentence is presented. This enables facilitating the user to understand the term symbol presented under the estimation condition that does not follow often in the dialog with the user.

In the case where a function that cannot be executed simultaneously with the function previously designated is designated within an allowable period of time after the function is designated by the user, the dialog management unit 31 or the dialog management unit 31A may update the frequency $f_i$ of an estimation condition for the function designated subsequently without updating the frequency $f_i$ of an estimation condition for the function previously designated.

For example, north up and heading up are in an exclusive relation being mutually related in terms of map orientation and cannot be executed simultaneously. In this case, in the case wherein heading up that is in an exclusive relation is designated within the allowable period of time after designation of north up, the frequency incremented last time for north up is restored to the original and the frequency for heading up is incremented.

As a result, in the case where a function different from the function corresponding to this term is erroneously designated due to insufficient comprehension of the user of the term, the frequency can be corrected such that this designation is not reflected in the estimation of the comprehension level.

Furthermore, in the first embodiment and the second embodiment, an estimation condition may include a state of the user. In this case, the dialog management unit 31 or the dialog management unit 31A updates the frequency $f_i$ at which a function is designated under an estimation condition corresponding to the state of the user on the basis of detection information of the state of the user.

In this manner, the user's comprehension level of a term symbol can be estimated depending on the state of the user.

Furthermore, in the first embodiment and the second embodiment, the case where a dialog with the user is performed in Japanese is illustrated, but the present invention is not limited thereto.

For example, by preparing data used for dialog processing such as response templates, the estimation condition table, the frequency table, and the term explanation table in various languages such as English, German, and Chinese, application to dialogs using these languages also becomes possible.

Note that, within the scope of the present invention, the present invention may include a flexible combination of the respective embodiments, a modification of any component of the respective embodiments, or omission of any component in the respective embodiments.

INDUSTRIAL APPLICABILITY

A response generation device according to the present invention is capable of appropriately facilitating a user's comprehension of a term used in a dialog and thus is suitable for, for example, an interface of a car navigation system in which a technical term is used to designate a function.

REFERENCE SIGNS LIST 1, 1A: Dialog control system, 2: Input unit, 3, 3A: Response generation device, 4: Output unit, 5: Frequency information storing unit, 5A: Estimation condition table, 5B: Frequency table, 5B-1, 5B-2: Frequency data, 5C: Term explanation table, 6: Explanatory information storing unit, 7: Response template storing unit, 20: Manual operation input unit, 21: Speech recognition unit, 30: Comprehension level estimating unit, 31, 31A: Dialog management unit, 32, 32A: Response generating unit, 33: Intention estimating unit, 100: Processing circuit, 101: Touch panel, 102: Microphone, 103: Speaker, 104: Monitor, 105: CPU, 106: Hard disk device, 107: Memory.

The invention claimed is:

1. A response generation device, comprising:
a processor; and
a memory storing instructions which, when executed by the processor, causes the processor to perform processes of:
for selecting a response template corresponding to a dialog state with a user from among response templates corresponding to predetermined dialog states and outputting a term symbol included in the selected response template;
for referring to an estimation condition table in which a plurality of estimation conditions defined by the predetermined dialog states and weights assigned to the respective estimation conditions corresponding to comprehension of term symbols are associated with each other and a frequency table in which frequencies at which a function is executed in the respective estimation conditions and a term symbol corresponding to the function are associated with each other, specifying the frequencies and the weights of the respective estimation conditions of the function corresponding to the input term symbol, and outputting a result of magnitude determination of a score calculated from the specified frequencies and the weights as a user's comprehension level of the term symbol; and for generating a response sentence in the dialog state with the user on a basis of the selected response template, adding an explanatory sentence to the response sentence depending on the user's comprehension level of the input term symbol, and outputting the response sentence.

2. The response generation device according to claim 1, wherein the processor calculates, as the score, a sum of values obtained by multiplying the frequencies and the weights for the respective estimation conditions.

3. The response generation device according to claim 1, wherein the processor generates and outputs a sentence in which an explanatory sentence is not added to the response sentence for a term symbol for which a comprehension level of the user is low and an explanatory sentence is added to the response sentence for a term symbol for which a comprehension level of the user is high.

4. The response generation device according to claim 1, wherein the processor generates a sentence in which an explanatory sentence is added before or after the response sentence for a term symbol for which a comprehension level of the user is low.

5. The response generation device according to claim 1, wherein the processor generates the response sentence in which a term is set to a term symbol for which a comprehension level of the user is high and generates the response sentence in which an explanatory sentence is set to a term symbol for which a comprehension level of the user is low.

6. The response generation device according to claim 1, wherein, in a case where the generated sentence has a length greater than or equal to a predetermined threshold value, the processor divides the sentence into a plurality of sentences each having a length less than the threshold value and outputs the sentences.

7. The response generation device according to claim 1, further comprising an intention estimating unit for estimating a function that the user intends to execute on a basis of input information.

8. The response generation device according to claim 1, wherein, when one of a plurality of functions in an exclusive relation, in which the plurality of functions are related to each other and cannot be executed simultaneously, is executed, the processor updates the frequency of an estimation condition under which the function has been executed for a term symbol corresponding to the executed function and also updates, also for a term symbol corresponding to a function which is in the exclusive relation and has not been executed, the frequency of an estimation condition the weight of which is smaller than that of the estimation condition under which the function has been executed.

9. The response generation device according to claim 1, wherein the processor generates and outputs a sentence including a term symbol and an explanatory sentence when a function corresponding to the term symbol is executed by the user without using the term symbol.

10. The response generation device according to claim 1, wherein the processor reduces the weight for an estimation condition the frequency of which is not updated even when a predetermined period of time elapses after the frequency has been updated last time.

11. The response generation device according to claim 1, wherein, when within an allowable period of time after execution of one of a plurality of functions in an exclusive relation, in which the plurality of functions cannot be executed simultaneously, has been designated, execution of another function in the exclusive relation is designated, the processor does not update the frequency of an estimation condition under which execution of the function has been designated previously but updates the frequency of an estimation condition under which execution of the other function has been designated.

12. A dialog control system, comprising:
a processor; and
a memory storing instructions which, when executed by the processor, causes the processor to perform processes of:
for selecting a response template corresponding to a dialog state with a user from among response templates corresponding to predetermined dialog states and outputting a term symbol included in the selected response template;
for referring to an estimation condition table in which a plurality of estimation conditions defined by the predetermined dialog states and weights assigned to the respective estimation conditions corresponding to comprehension of term symbols are associated with each other and a frequency table in which frequencies at which a function is executed in the respective estimation conditions and a term symbol corresponding to the function are associated with each other, specifying the frequencies and the weights of the respective estimation conditions of the function corresponding to the input term symbol, and outputting a result of magnitude determination of a score calculated from the specified frequencies and the weights as a user's comprehension level of the term symbol;
for generating a response sentence in the dialog state with the user on a basis of the selected response template, adding an explanatory sentence to the response sentence depending on the user's comprehension level of the input term symbol, and outputting the response sentence;
an input device to accept the dialog with the user; and
an output device to present the output sentence to the user.

13. A response generation method, comprising:
selecting a response template corresponding to a dialog state with a user from among response templates corresponding to predetermined dialog states;
outputting a term symbol included in the selected response template;
referring to an estimation condition table in which a plurality of estimation conditions defined by the predetermined dialog states and weights assigned to the respective estimation conditions corresponding to comprehension of term symbols are associated with each other and a frequency table in which frequencies at which a function is executed in the respective estimation conditions and a term symbol corresponding to the function are associated with each other;
specifying the frequencies and the weights of the respective estimation conditions of the function corresponding to the input term symbol;

outputting a result of magnitude determination of a score calculated from the specified frequencies and the weights as the user's comprehension level of the term symbol;

generating a response sentence in the dialog state with the user on a basis of the selected response template;

adding an explanatory sentence to the response sentence depending on a user's comprehension level of the input term symbol; and outputting the response sentence.

* * * * *